United States Patent
Lehn et al.

(10) Patent No.: US 11,289,906 B2
(45) Date of Patent: Mar. 29, 2022

(54) MULTI-PORT CONVERTER STRUCTURE FOR DC/DC POWER CONVERSION

(71) Applicant: THE GOVERNING COUNCIL OF THE UNIVERSITY OF TORONTO, Toronto (CA)

(72) Inventors: Peter Waldemar Lehn, Toronto (CA); Mike Kavian Ranjram, Toronto (CA); Sebastian Rivera Iunnissi, Toronto (CA); Yuanzheng Han, Toronto (CA)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 0 days.

(21) Appl. No.: 16/994,553

(22) Filed: Aug. 15, 2020

(65) Prior Publication Data
US 2021/0036515 A1 Feb. 4, 2021

Related U.S. Application Data

(63) Continuation of application No. 15/789,466, filed on Oct. 20, 2017, now Pat. No. 10,770,893, which is a
(Continued)

(51) Int. Cl.
*H02J 1/00* (2006.01)
*H02J 1/10* (2006.01)
(Continued)

(52) U.S. Cl.
CPC ............... *H02J 1/102* (2013.01); *H02J 1/02* (2013.01); *H02J 7/0024* (2013.01); *H02J 7/345* (2013.01);
(Continued)

(58) Field of Classification Search
CPC .................................. H02J 1/02; H02J 1/102
See application file for complete search history.

(56) References Cited

U.S. PATENT DOCUMENTS

| 6,222,352 B1 | 4/2001 | Lenk |
| 7,061,214 B2 | 6/2006 | Mayega et al. |
| (Continued) | | |

OTHER PUBLICATIONS

Z. Zheng, K Wang, L Xu and Y Li, "A Hybrid Cascaded Multilevel Converter for Battery Energy Management Applied in Electric Vehicles," IEEE Trans. Power Electronics, vol. 29, No. 7, pp. 3537-3546, Jul. 2014.
(Continued)

*Primary Examiner* — Adi Amrany
(74) *Attorney, Agent, or Firm* — Norton Rose Fulbright Canada LLP

(57) ABSTRACT

A module for interconnecting a pair of DC sources or a pair of DC loads into a DC bus includes: a first port for each source or load; a switching cell for each first port, each cell having a pair of terminals and a switching node; a second port operatively connected to the DC bus and having a pair of terminals, one of the pair of terminals of the second port being connected to one of the terminals of one of the cells and the other of the pair of terminals of the second port being connected to one of the terminals of the other of the cells; and a filter inductor connected between the switching nodes of the cells. Systems including the module and methods utilizing the system are also disclosed.

20 Claims, 30 Drawing Sheets

Related U.S. Application Data continuation of application No. 15/308,566, filed as application No. PCT/CA2015/050361 on Apr. 30, 2015, now Pat. No. 10,291,123.

(60) Provisional application No. 62/411,168, filed on Oct. 21, 2016, provisional application No. 61/987,746, filed on May 2, 2014.

(51) Int. Cl.
    *H02M 3/158* (2006.01)
    *H02J 7/34* (2006.01)
    *H02J 7/00* (2006.01)
    *H02M 1/15* (2006.01)
    *H02J 1/02* (2006.01)
    *H02M 1/00* (2006.01)

(52) U.S. Cl.
    CPC ............ *H02M 1/15* (2013.01); *H02M 3/158* (2013.01); *H02J 1/106* (2020.01); *H02M 1/0067* (2021.05); *H02M 1/0077* (2021.05); *H02M 1/0083* (2021.05); *H02M 3/1586* (2021.05)

(56) References Cited

U.S. PATENT DOCUMENTS

| | | |
|---|---|---|
| 7,276,886 B2 | 10/2007 | Kinder et al. |
| 2010/0229915 A1 | 11/2010 | Ledenev et al. |
| 2012/0043818 A1 | 2/2012 | Stratakos et al. |
| 2012/0126624 A1 | 5/2012 | Hester et al. |
| 2015/0137606 A1 | 5/2015 | Adest et al. |

OTHER PUBLICATIONS

"Operation of battery power modules with series output", Chin-Sien Moo; Kong-Soon Ng; Jin-Shin Hu, 2009 IEEE International Conference on Industrial Technology, Year: 2009, pp. 1-6, DOI: 10.1109/ICIT.2009.4939672, IEEE Conference Publications.

"Cascaded DC-DC Converter Photovoltaic Systems: Power Optimization Issues", Antoneta Iuliana Bratcu; Iulian Munteanu; Seddik Bacha; Damien Picault; Bertrand Raison, IEEE Transactions on Industrial Electronics, Year: 2011, vol. 58, Issue: 2, pp. 403-411, DOI: 10.1109/TIE.2010.2043041, IEEE Journals & Magazines.

"Fast reconfigurable photovoltaic switching cell integrated within DC-DC converters", Jen-Hung Huang; Ye Zhao; Brad Lehman, 2014 IEEE Applied Power Electronics Conference and Exposition—APEC 2014, Year: 2014, pp. 629-636 DOI: 10.1109/APEC.2014.6803374, IEEE Conference Publications.

"Modeling the combination of UPQC and photovoltaic arrays with Multi-Input Single-Output DC-DC converter", M. Davari; S. M. Ale-Emran; H. Yazdanpanahi; G. B. Gharehpetian, 2009 IEEE/PES Power Systems Conference and Exposition, Year: 2009, pp. 1-7, DOI: 10.1109/PSCE.2009.4840102, IEEE Conference Publications.

"Steady-state characterization of multi-phase, interleaved Dc-Dc converters for photovoltaic applications", Sairaj V. Dhople; Ali Davoudi; Patrick L. Chapman, 2009 IEEE Energy Conversion Congress and Exposition, Year: 2009, pp. 330-336, DOI: 10.1109/ECCE.2009.5316415, IEEE Conference Publications.

"Nondissipative String Current Diverter for Solving the Cascaded DC-DC Converter Connection Problem in Photovoltaic Power Generation System", Riad Kadri; Jean-Paul Gaubert; Gerard Champenois, IEEE Transactions on Power Electronics, Year: 2012, vol. 27, Issue: 3, pp. 1249-1258, DOI: 10.1109/TPEL.2011.2164268, IEEE Journals & Magazines.

Ki et al., "Single-inductor multiple-output switching converters", Power Electronics Specialists Conference, 2001, PESC. 2001 IEEE 32nd Annual, vol. 1, p. 226-231.

International Search Report and Written Opinion issued in International Application No. PCT/CA2015/050361, dated Jul. 16, 2015.

Sze et al., "Integrated single-inductor dual-input dual-output boost converyer for energy harvesting applications", Circuits and Systems, 2008, ISCAS 2008 IEEE International Symposium on, May 18-21, 2008, p. 2218-2221.

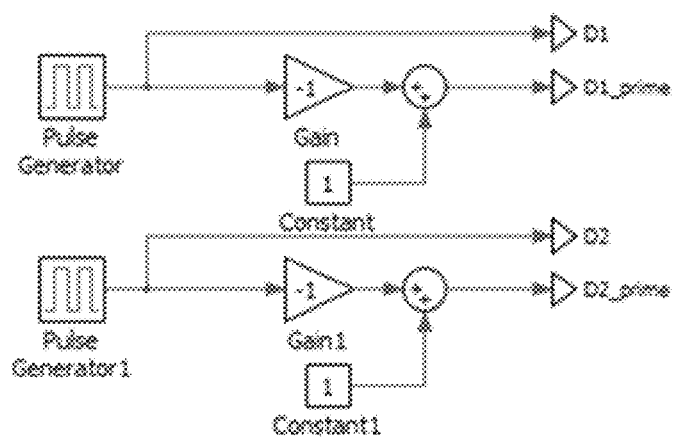
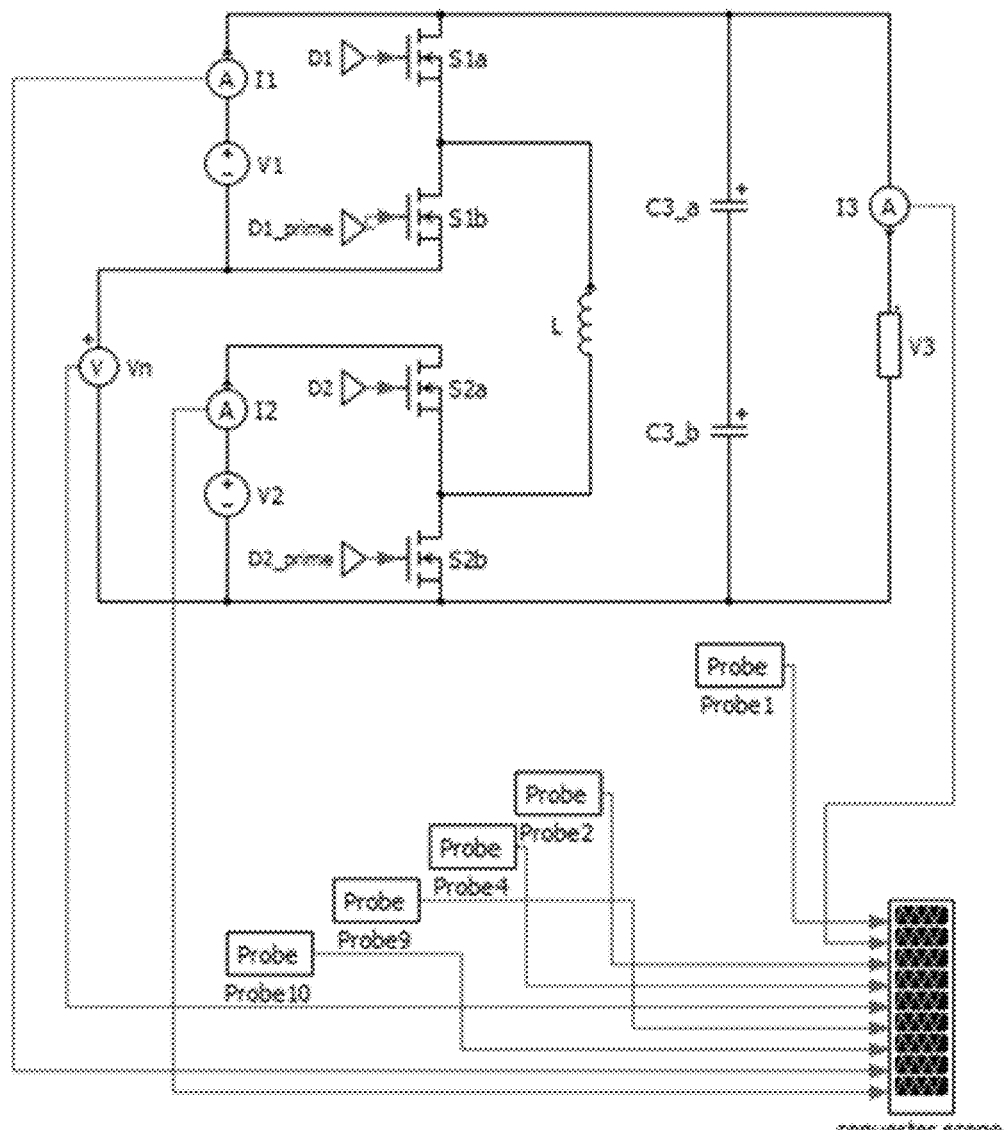
FIG. 8

MULTI-PORT CONVERTER STRUCTURE FOR DC/DC POWER CONVERSION

CROSS-REFERENCE TO CO-PENDING APPLICATIONS

This application is a continuation of U.S. patent application Ser. No. 15/789,466 filed on Oct. 20, 2017, which is a continuation-in-part of U.S. patent application Ser. No. 15/308,566 (now U.S. Pat. No. 10,291,123), which is a national phase entry of PCT patent application PCT/CA2015/050361, filed on Apr. 30, 2015, which claims priority to U.S. Provisional Patent Application 61/987,746, filed May 2, 2014, This application also claims all benefit including priority to U.S. Provisional Patent Application No. 62/411,168, filed Oct. 21, 2016, and entitled "MULTI-PORT CONVERTER STRUCTURE FOR DC/DC POWER CONVERSION".

FIELD

This invention relates to the field of power converters for dc systems.

BACKGROUND

A two-quadrant buck converter, also known as a synchronous buck converter, is a type of basic switch-mode dc/dc converter that is used to regulate voltage and provide efficient dc power transfer in energy systems. The traditional two-quadrant buck converter cell, shown in FIG. 20 (prior art), comprises a pair of complimentary power switches and input capacitor. An output L-C low-pass filter is employed when a small high frequency ripple for the output voltage is required. For steady state operation, switch $S_1$ is turned "on" (i.e. switch $S_1$ is closed) and $S_2$ is turned "off" (i.e. switch $S_1$ is opened) during time interval $D \cdot T_s$. The converter duty cycle D, which ranges from 0 to 100%, represents the percentage time when switch $S_1$ is on (and thus when $S_2$ is off) during switching period $T_s$. During each time interval $D \cdot T_s$, voltage $v_x$ at node x becomes equal to input voltage $V_{in}$ as shown in FIG. 20. Voltage $v_x$ becomes zero when switch $S_1$ is turned off (and thus when $S_2$ is turned on) for the remainder of the switching period, due to the complimentary switching action of $S_1$ and $S_2$. Based on this discussion, the voltage $v_x$ can be viewed as having an average value of $D \cdot V_{in}$ with a set of high frequency switching harmonics. The L-C low-pass filter is designed such that it attenuates the high frequency switching harmonics of $v_x$ and allows the output voltage $V_{out}$ to be equal to the average value $D \cdot V_{in}$. Assuming the output voltage is externally regulated, the inductor current $I_L$ can be made to take on either a positive or negative average value through adjustment of the converter duty cycle, thus enabling bidirectional energy transfer between input and output terminals. Therefore, voltage regulation and bidirectional energy transfer can be achieved easily by suitable control of the duty cycle D in a two-quadrant buck converter.

It should be understood that a unidirectional variant of the bidirectional buck converter in FIG. 20 can be realized, by, for example, replacing switch S2 with a diode. The unidirectional buck converter can be employed for applications where only input to output power transfer capability is needed. Multiple two-quadrant buck converter cells with associated filters can also be connected in series to form "classical cascaded buck converters". FIG. 21 (i.e. prior art) shows a classical cascaded buck converter comprised of three individual dc/dc buck converter cells, each with associated output filtering, connected in series. The topology shown has three input ports and one output port. Each of the input ports and the output port consists of two terminals as shown. Observe each input port has an assigned reference terminal with its voltage defined relative to ground, i.e. $v_{n1}$, $v_{n2}$ and $v_{n3}$. By chosen convention the reference terminals are selected such that they correspond to the bottom connection point of each input port capacitor. To limit voltages to ground, a single reference terminal is typically connected to ground. In FIG. 21, the reference terminal selected for ground connection is shown by the dotted connection from $v_{n3}$ to ground. However, it must be stressed this choice is entirely arbitrary, i.e. any other reference terminal in FIG. 21 could have been connected to ground. The classical cascaded buck converter allows multiple input ports to exchange energy with a common output port, wherein the output voltage can be significantly higher than individual input voltages. This flexibility makes the classical cascaded buck converter suitable for a wide range of applications such as photovoltaic systems and battery management units.

Present state-of-the-art technology having similar application and functionality compared to the classical cascaded buck converter in FIG. 21 is the cascaded connection of two-quadrant buck converter cells that share a single L-C low-pass filter, shown in FIG. 22. However, with exception of the one ground-connected reference terminal, all other input reference terminal voltages for this topology, i.e. $v_{n1}$ and $v_{n2}$, are subject to undesired high frequency switching ripple voltage. As a result, energy sources that are connected to these input ports, for example, solar panels or batteries, will suffer from significant capacitive current to ground. In contrast, the classical cascaded buck converter with multiple low-pass L-C filters as shown in FIG. 21 can reduce the high frequency switching ripple voltage on $v_{n1}$ and $v_{n2}$, provided that individual L-C filter elements are sufficiently large. However, this comes at the expense of an overall increase in both the size and number of energy storage components (inductors and capacitors). The additional components increase the loss and cost of the classical cascaded buck converter.

SUMMARY OF THE INVENTION

It will be evident from the foregoing, and from a review of the detailed description that follows, that the multi-port converter topologies for do/dc power conversion embodied within the apparatus are of significant advantage, in that, inter alia, they:
 are modular and scalable;
 can be designed to have an arbitrarily small high frequency switching voltage ripple magnitude at all input and output reference terminals;
 are capable of bidirectional energy exchange between input ports and output port;
 are capable of controlling power sharing among the input ports;
 are capable of allowing multiple inputs to exchange energy with a common output, wherein the output voltage can be significantly higher than individual input voltages;
 have relatively low rating of components; in particular, the net rating of energy storage components (capacitors and inductors) are small compared to the classical cascaded buck converter;

are highly flexible in that they can be cascaded with modules of the same topology or cells of differing topology.

allow for input and output ports to be re-defined to offer a wider range of functionality, including options where only 2 ports of the circuit are used.

Other advantages and features associated with the multi-port converter topology will become evident upon a review of the following detailed description and the appended drawings, the latter being briefly described hereinafter.

BRIEF DESCRIPTION OF THE DRAWINGS

FIG. 3B Equivalent circuit diagram for FIG. 1 corresponding to switching state #1: switch $S_{1b}$ and switch $S_{2a}$ turned on;

FIG. 3C Equivalent circuit diagram for FIG. 1 corresponding to switching state #2: switch $S_{1a}$ and switch $S_{2a}$ turned on;

FIG. 3D Equivalent circuit diagram for FIG. 1 corresponding to switching state #3: switch $S_{1a}$ and switch $S_{2b}$ turned on;

FIG. 3E Equivalent circuit diagram for FIG. 1 corresponding to switching state #4: switch $S_{1b}$ and switch $S_{2b}$ turned on;

FIG. 8 Simulation model for FIG. 1 implemented in PLECS;

DETAILED DESCRIPTION

Figure 1:
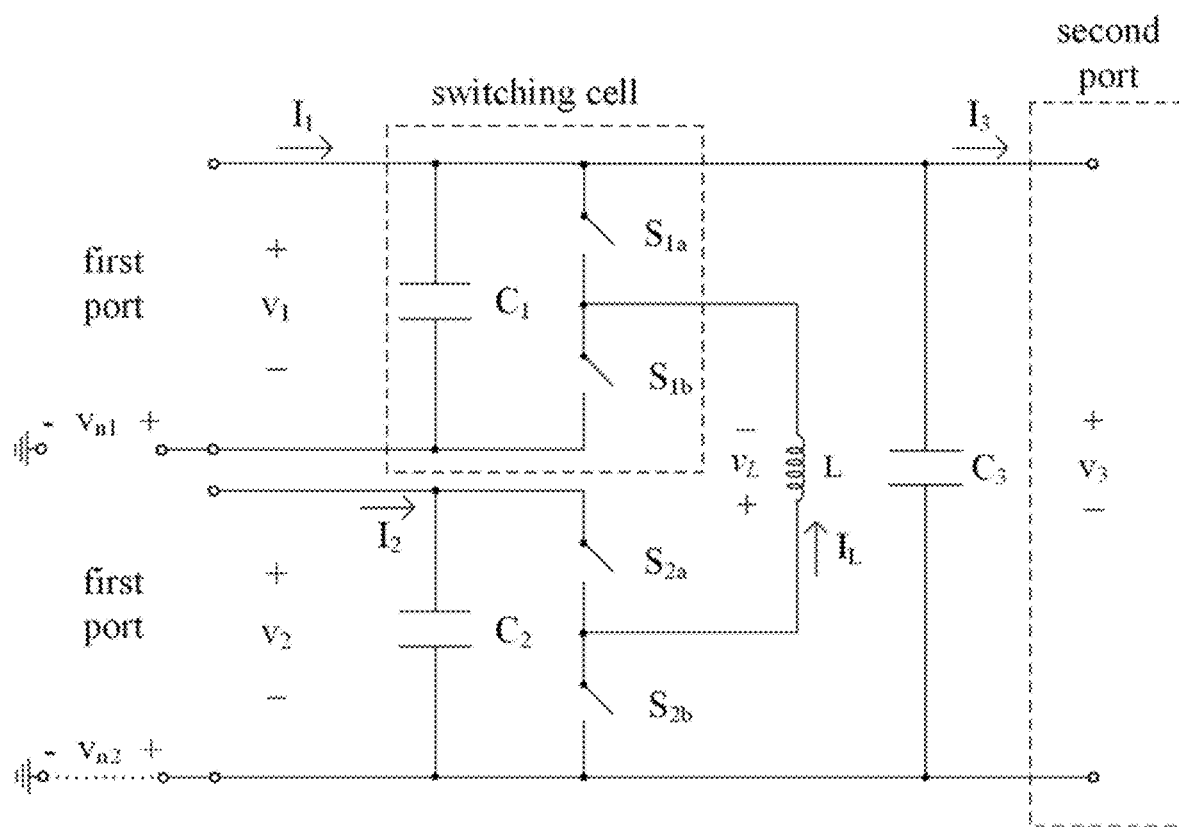
FIG. 1 Double-input single-output converter module with generalized power switches.

The dc/dc converter module shown in FIG. 1 has two first ports, labelled with voltages "$v_1$" and "$v_2$". and one second port, labelled with voltage "$v_3$". In this document, an "input" port refers to a port that connects to a dc source or load, while an "output" port refers to the port that is operationally connected to the dc bus. Throughout this document, first ports and "input" ports are used interchangeably, and second ports and "output" ports are similarly interchangeable. Thus, the converter module in FIG. 1 is referred to as a double-input single-output converter module.

The converter module in FIG. 1 is comprised of two synchronous buck converter cells with a single filter inductor as shown. A key topological feature of the double-input single-output converter module is the placement of inductor L across the two inner switches $S_{1b}$ and $S_{2a}$ as shown. This configuration results in the inductor being effectively "isolated" from the output port terminals. That is, due to the imposed connection of L across non-matching switches of the two buck converter cells, the output port terminals may be connected directly to input port terminals as shown. This natural topological feature is seen as highly advantageous in achieving an arbitrarily small high frequency switching ripple magnitude at all input and output reference terminals in FIG. 1, as it avoids reliance on excessively sized passive filters to achieve this goal.

Figure 2:
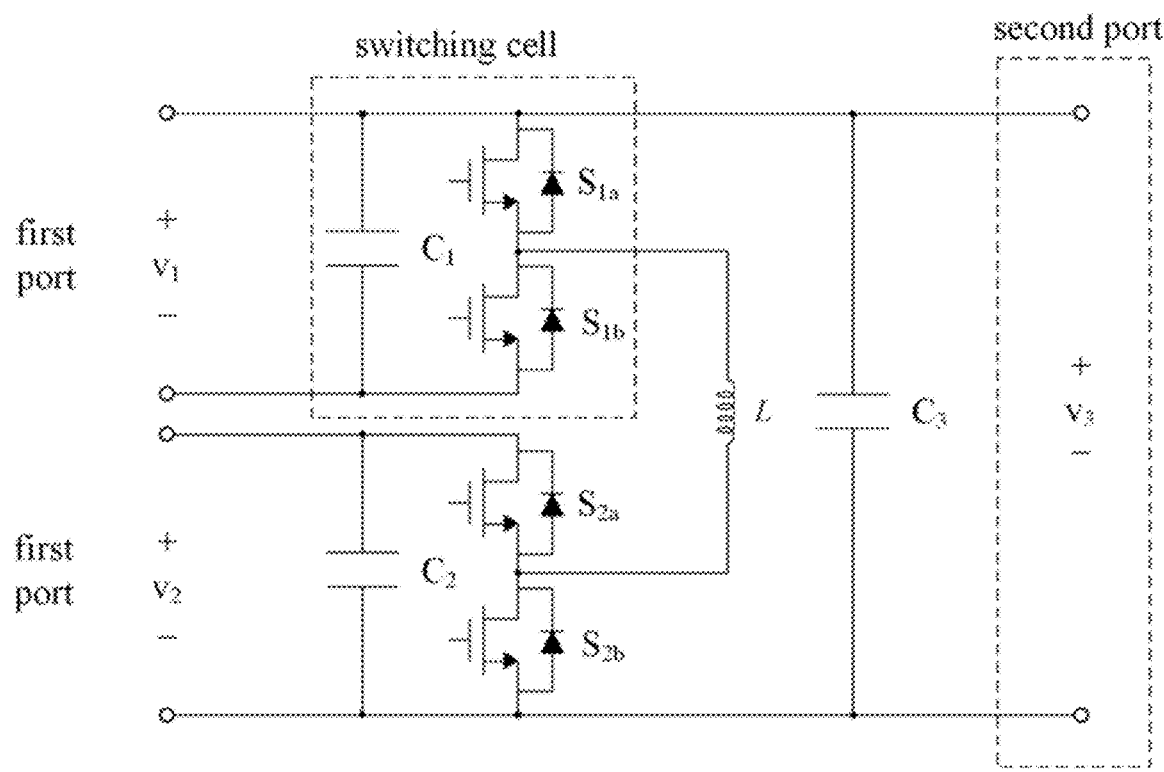
FIG. 2 One example of power switches realization using MOSFETs and diodes for the double-input single-output converter module in FIG. 1.

The converter module in FIG. 1 employs two pairs of complimentary switches: 1) $S_{1a}$, $S_{1b}$ and 2) $S_{2a}$, $S_{2b}$. Similar to the convention illustrated in FIG. 20, duty cycle command $D_1$ controls the percentage time that $S_{1a}$ is on (and thus $S_{1b}$ is off) and duty cycle command $D_2$ controls the percentage time that $S_{2a}$ is on (and thus $S_{2b}$ is off). An interleaved operation of the two pairs of switches is possible for this topology, where controlling a relative phase shift, $\Phi$, between $D_1$ and $D_2$ can regulate the order in which the four switches are turned on (over each switching period $T_s$). However, interleaved operation is optional, i.e. interleaved operation of the buck converter cells in FIG. 1 is not required. The two pairs of complimentary power switches can be implemented using a number of different switching devices or technologies; one possible example of an implementation using MOSFETs and Diodes is shown in FIG. 2. It should be understood that there are many possible implementations of the switches and energy storage components shown for the double-input single-output converter module in FIG. 1. Therefore, such variants are considered as being functionally similar to FIG. 1.

Bidirectional energy exchange between the input ports and output port in FIG. 1 is possible. Specifically, power can be transferred either: 1) from the output port to both input ports or 2) from both input ports to the output port. A salient operational feature of the topology in FIG. 1 is that power sharing among the two inputs can be achieved in a controlled manner, as will be demonstrated in the latter simulations section. It should be understood that a unidirectional variant of FIG. 2 can be easily realized, by, for example, replacing two of the four MOSFET switches with diodes.

Double-Input Single-Output Converter Module: Theory of Operation

Due to the flexible and scalable nature of the double-input single-output converter module shown in FIG. 1, there are many possible methods or strategies in which to operate the converter. Therefore, the subsequent operational analysis should not be considered to be limiting. For demonstration purposes and ease of understanding, the following assumptions are imposed to illustrate the key characteristics of the topology:

All switching devices and energy storage components (i.e. inductors and capacitors) are lossless;
Dead time for switches is neglected to simplify mathematical analysis.

Figure 3A:
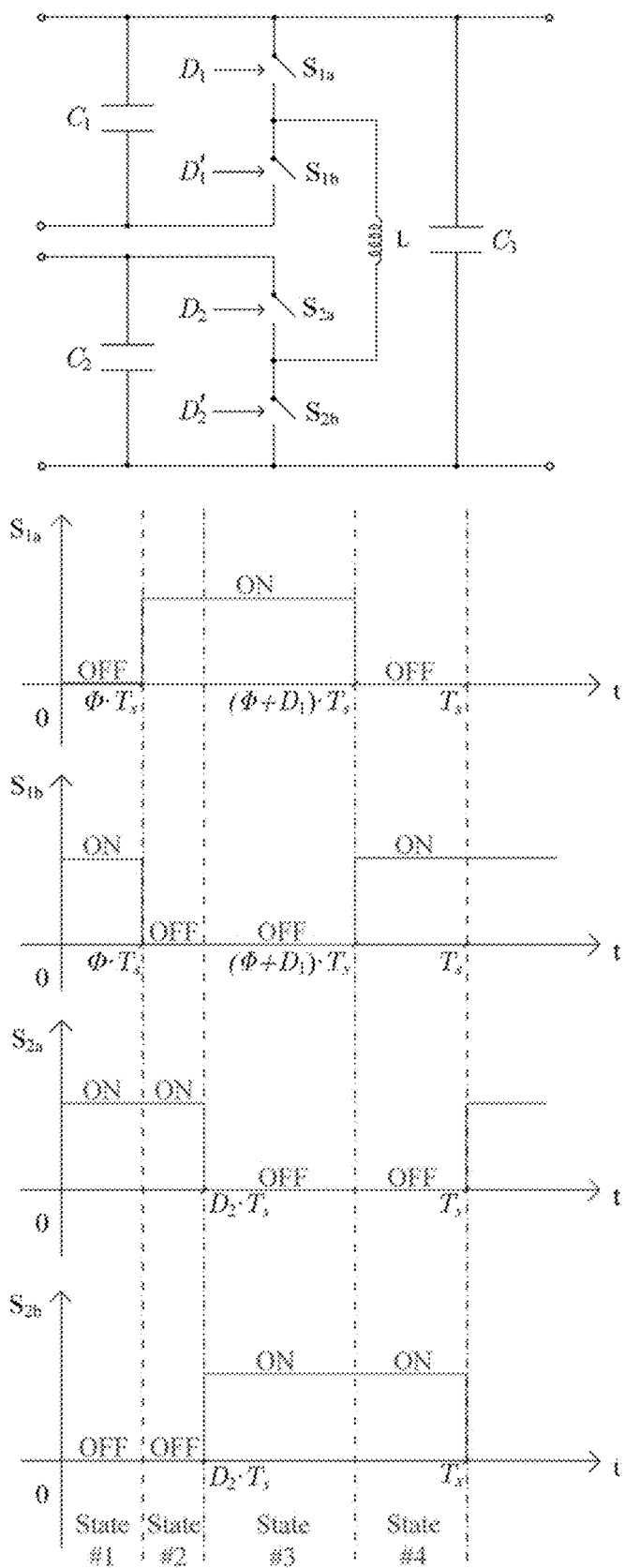
FIG. 3A One possible gating strategy with corresponding switching states for double-input single-output converter module in FIG. 1.
Figure 3B:
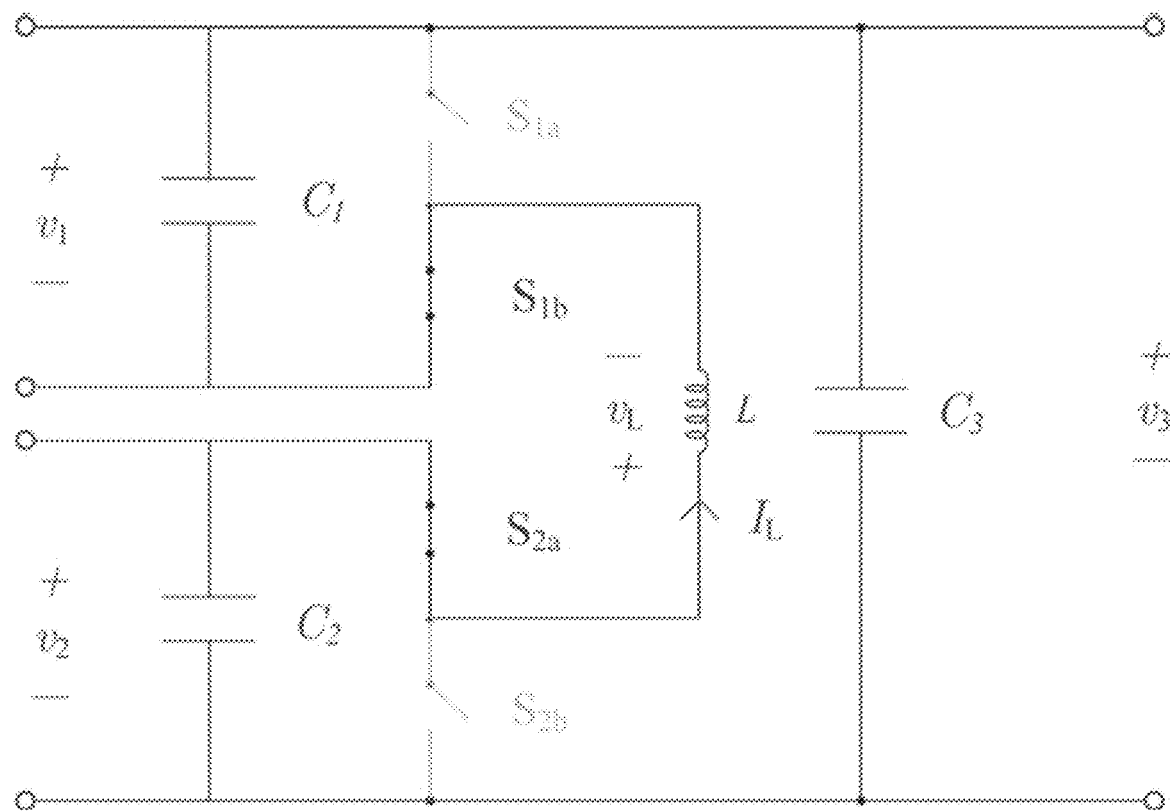
Figure 3C:
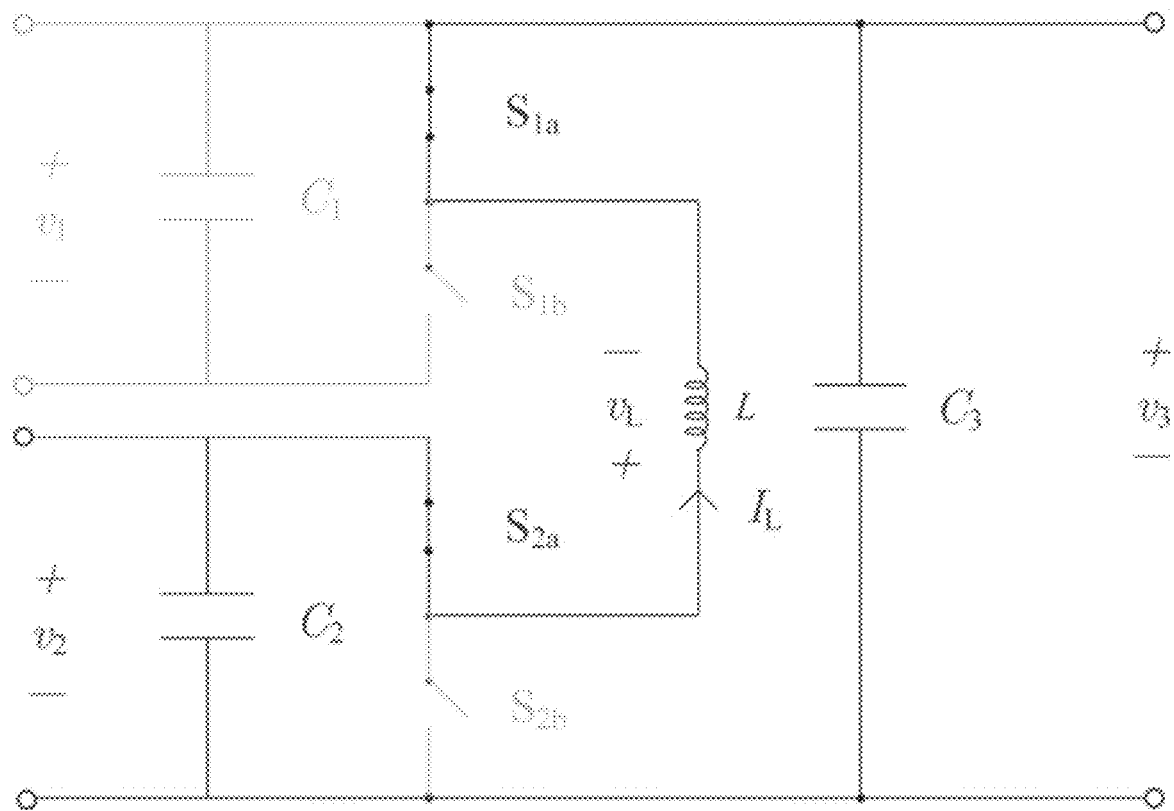
Figure 3D:
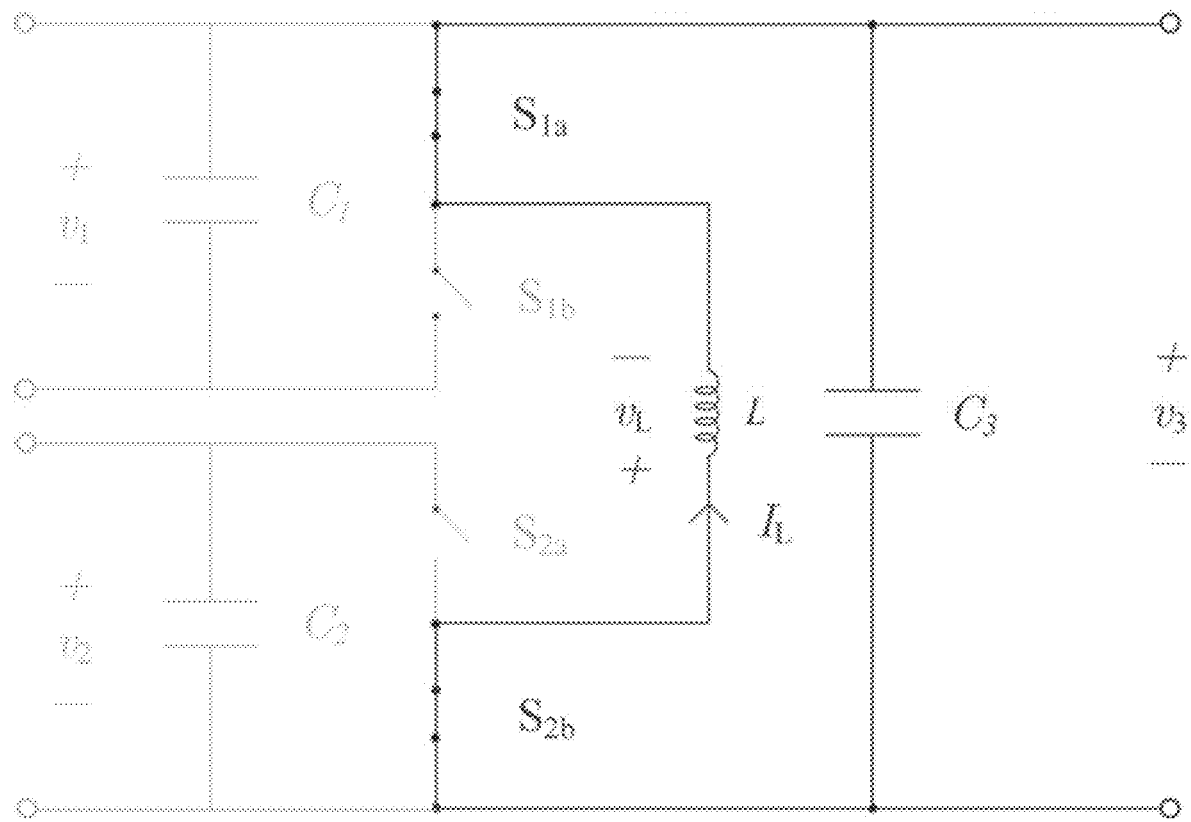
Figure 3E:
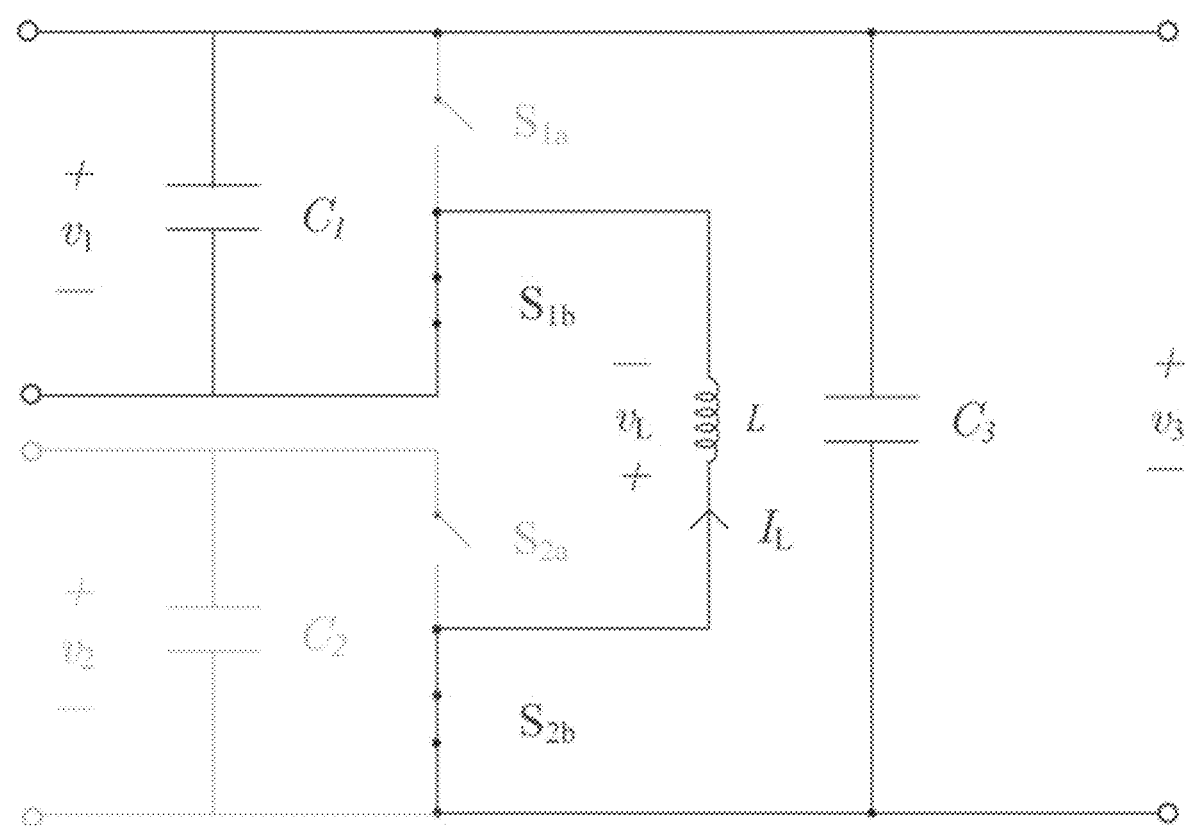

Reference is now made to FIG. 1. Switches $S_{1a}$ and $S_{1b}$ are controlled by duty cycle command $D_1$ while switches $S_{2a}$ and $S_{2b}$ are controlled by duty cycle command $D_2$. It is assumed the two pairs of switches have the same switching period $T_s$, however, this is done for ease of understanding as such an assumption is not necessary to obtain the following results. In general, four possible switching states exist for the converter module in FIG. 1; these four states are illustrated in FIG. 3B, FIG. 3C, FIG. 3D, and FIG. 3E. One possible switching pattern that can generate all four switching states is given in FIG. 3A, where $\Phi$ is the (per-unitized) relative phase shift between $D_1$ and $D_2$ commands. Note in FIG. 3A the order of the switching states is indicated, however, as discussed previously, the order and duration of switching states can vary and thus the assumed diagram in FIG. 3A is not unique. The duty cycle commands for each power switch are defined in FIG. 3A, where $D'_1=1-D_1$ and $D'_2=1-D_2$.

The inductor voltage corresponding to the four possible switching states of FIG. 1, as illustrated in FIG. 3A, are:

State #1:
$$v_L = V_1 + V_2 - V_3 \quad (1)$$

State #2:
$$v_L = V_2 - V_3 \quad (2)$$

State #3:
$$v_L = -V_3. \quad (3)$$

State #4:
$$v_L = V_1 - V_3 \quad (4)$$

The principle of inductor volt-second balance (IVSB) dictates that the average inductor voltage over one switching period in steady state is zero. Consequently, the following voltage relationship can be derived when equating the average inductor voltage to zero using IVSB:

$$V_3 = (1-D_1)V_1 + D_2 V_2. \quad (5)$$

The voltage relationship in (5) does not make any assumptions on the values of $D_1$, $D_2$, $\Phi$, $V_1$, $V_2$ or $V_3$ within their permissible range and is independent of the switching period, and thus be considered a general design equation for this topology. However, a set of values for $D_1$, $D_2$, and $\Phi$ can be selected to achieve a minimum inductor ripple current and a minimum capacitor ripple voltage.

Similar to the preceding analysis, a current relationship can also be found using the principle of capacitor charge balance (CCB). The principle of CCB dictates the average capacitor current over one switching period in steady state is zero. By equating the average capacitor current to zero for each port, the following current relationship can be derived $$I_3 = \frac{I_1}{1-D_1} = \frac{I_2}{D_2} \quad (6)$$

The polarity of currents in (6) correspond to those assumed in FIG. 1.

Cascaded Topologies Formed by Series-Stacking Multiple Converter Modules

Figure 4:
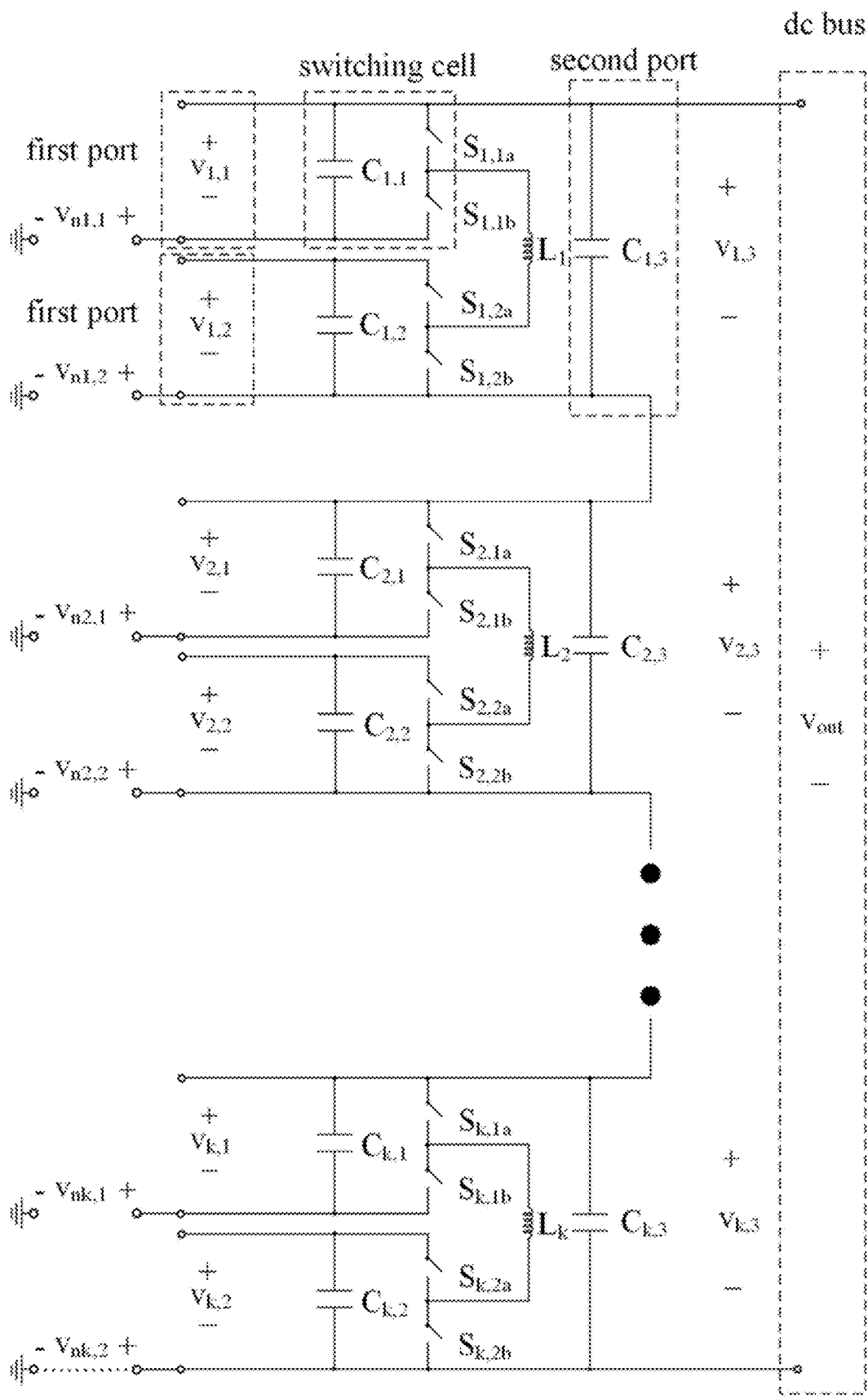
FIG. 4 Series-stacking 'k' double-input single-output converter modules in FIG. 1 to form a 2k-input single-output cascaded dc/dc converter structure.

The double-input single-output dc/dc converter module shown in FIG. 1 can be extended to form cascaded topologies by stacking multiple modules in series. FIG. 4 shows one possible example of such a cascaded topology where k double-input single-output converter modules are stacked to form a 2k-input single-output structure. Each of the k modules has the same topology as shown in FIG. 1, but individual modules do not necessarily need to employ the same energy storage components, or same realization of the power switches. The cascaded converter structure shown in FIG. 4 enables additional inputs (i.e. more than two) to exchange energy with a common output, wherein the output voltage can be significantly higher than individual input voltages.

The stack of k modules in FIG. 4 can be gated (i.e. switched) on/off at a relatively high common switching frequency corresponding to $f_s=1/T_s$, as is the case with conventional switch-mode converters. Output L-C filter components are designed to attenuate high frequency ripple associated with switch-mode operation. However, in contrast to high frequency (i.e. switch-mode) operation, substantially lower switching frequencies can also be exploited to operate the majority of modules in a "voltage stacking mode". The term "voltage stacking mode" refers to where select modules, or, select switching converter cells within individual modules, are inserted or removed from the cell stack for extended periods of time. This is inherently different from conventional switch-mode operation where cells are switched in/out at much higher switching frequencies, typically according to some form of pulse-width modulation. Taking into consideration both switch-mode operation and voltage stacking mode, values of $f_s$ for an individual cell can be anywhere from less than 1 Hz to several hundred kHz. Higher switching frequencies (i.e. more than several hundred kHz) can also be adopted. There is no requirement the switching frequency of individual cells in FIG. 4 must be equal; in general, each buck converter cell can employ a different $f_s$.

Figure 5:
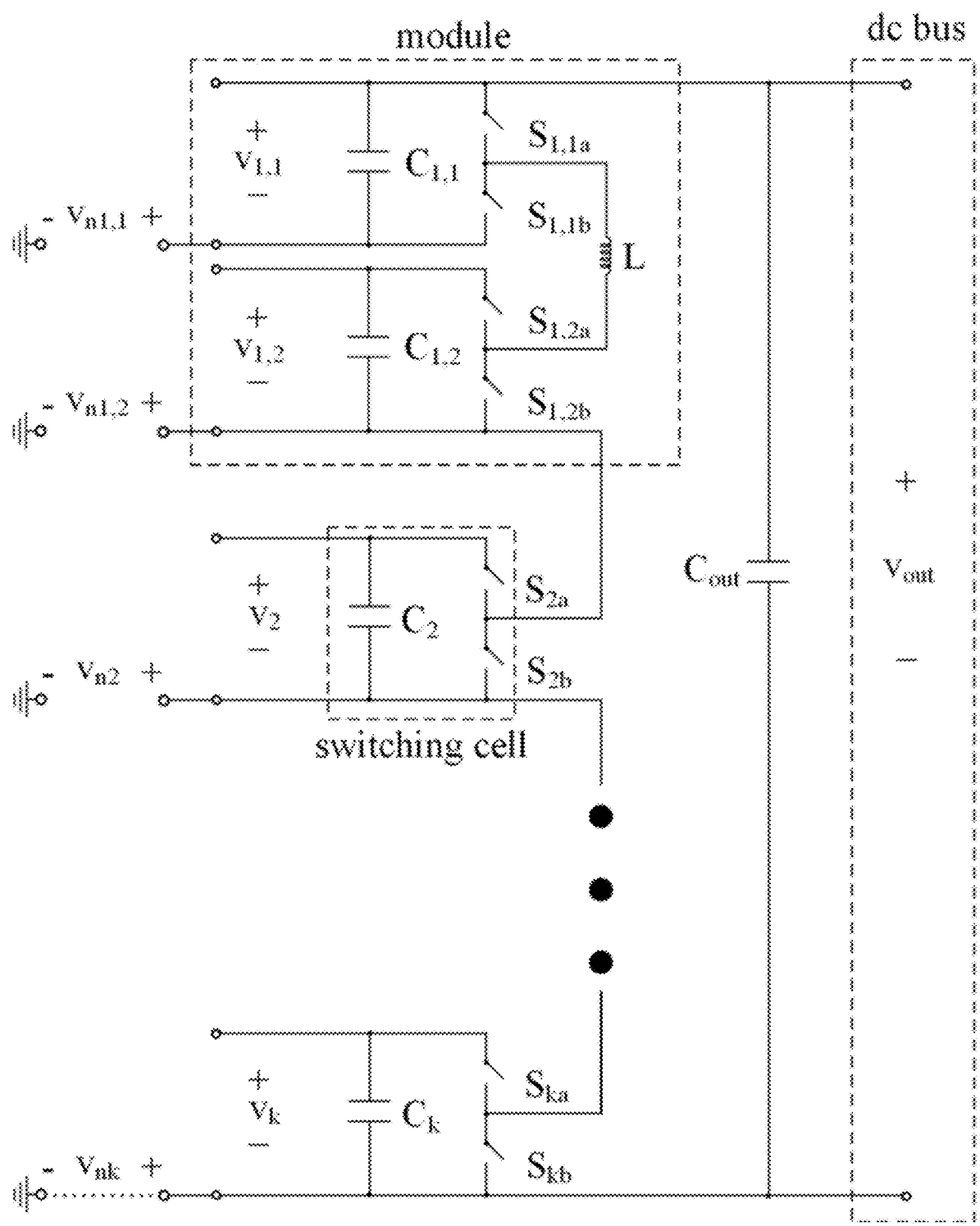
FIG. 5 Series-stacking one double-input single-output converter module of FIG. 1 with (k−1) two-quadrant buck converter cells to form a (k+1)-input single-output cascaded dc/dc converter structure.

The converter structure in FIG. 4 is only one example of how multiple double-input single-output converter modules of FIG. 1 can be utilized to create a cascaded architecture with increased number of inputs. Reference is now made to FIG. 5, where a single converter module from FIG. 1 is series-stacked with (k−1) two-quadrant buck converter cells (i.e. switching cells) to form a (k+1)-input single-output cascaded structure. The resulting string of cascaded cells is partitioned into a "high/low-frequency cell stack" and a "low-frequency cell stack". The "high/low-frequency cell stack" comprises the two switching cells in the converter module and signifies that these cells are capable of operating: 1) both as high-frequency switch-mode converters, 2) both in low-frequency voltage stacking mode, or 3) in any combination thereof.

The "low-frequency cell stack" in FIG. 5 comprises the remaining switching cells (i.e. the cells that do not comprise the module) and signifies that the (k−1) series-cascaded cells operate exclusively in a low-frequency voltage stacking mode. That is, in general, the on-off states for each pair of complimentary switches in the "low-frequency cell stack" do not change during several successive high-frequency switching periods of the neighbouring "high/low-frequency cell stack".

Switching frequencies employed for the "low-frequency cell stack" can be many orders of magnitude smaller than the associated switch-mode operating frequency of the "high/low-frequency cell stack". It should be stressed that on-off state durations of complimentary switch pairs within the "low-frequency cell stack" can be made to be arbitrarily long, i.e. there is no fundamental constraint placed on the maximum 'on' state duration for each pair of complimentary switches within the "low-frequency cell stack".

Based on the above discussion, the input port reference terminal voltages $v_{n1,1}$, $v_{n1,2}$ and $v_{n2}$ to $v_{n(k-1)}$ in FIG. 5 are not subject to appreciable high-frequency switching ripple voltage. Voltages $v_{n1,1}$, $v_{n1,2}$ in the high/low-frequency cell stack achieve this by exploiting the structure in FIG. 1, while voltages $v_{n2}$ to $v_{n(k-1)}$ achieve this by leveraging a very low frequency operation of the low-frequency cell stack. Note $v_{nk}$ is connected to ground in FIG. 5 and thus does not experience any switching voltage stress.

An advantage of the topology in FIG. 5 over the structures described in, for example, Z. Zheng, K Wang, L Xu and Y Li, "A Hybrid Cascaded Multilevel Converter for Battery Energy Management Applied in Electric Vehicles," *IEEE Trans. Power Electronics*, vol. 29, no. 7, pp. 3537-3546, July 2014. ["Zheng et al."] is that it can be designed to have arbitrarily small high-frequency switching ripple magnitude at all input and output reference terminals, while simultaneously achieving reduced component count, cost, and loss. This is evident when inspecting FIG. 5 as only one interface inductor and one output filter capacitor is needed.

It should be understood the cascaded structure in FIG. 5 is only one example of how the basic converter module in FIG. 1 can be arranged with series-cascaded two-quadrant buck converter cells. Any number of double-input single-output converter modules of FIG. 1 can be utilized (i.e. not only limited to a single module as shown in FIG. 5), as well as any number of two-quadrant series-cascaded buck converter cells. Other alternatives are possible, such as, for example, the order in which individual cells are stacked in series within the resulting string.

Figure 6:
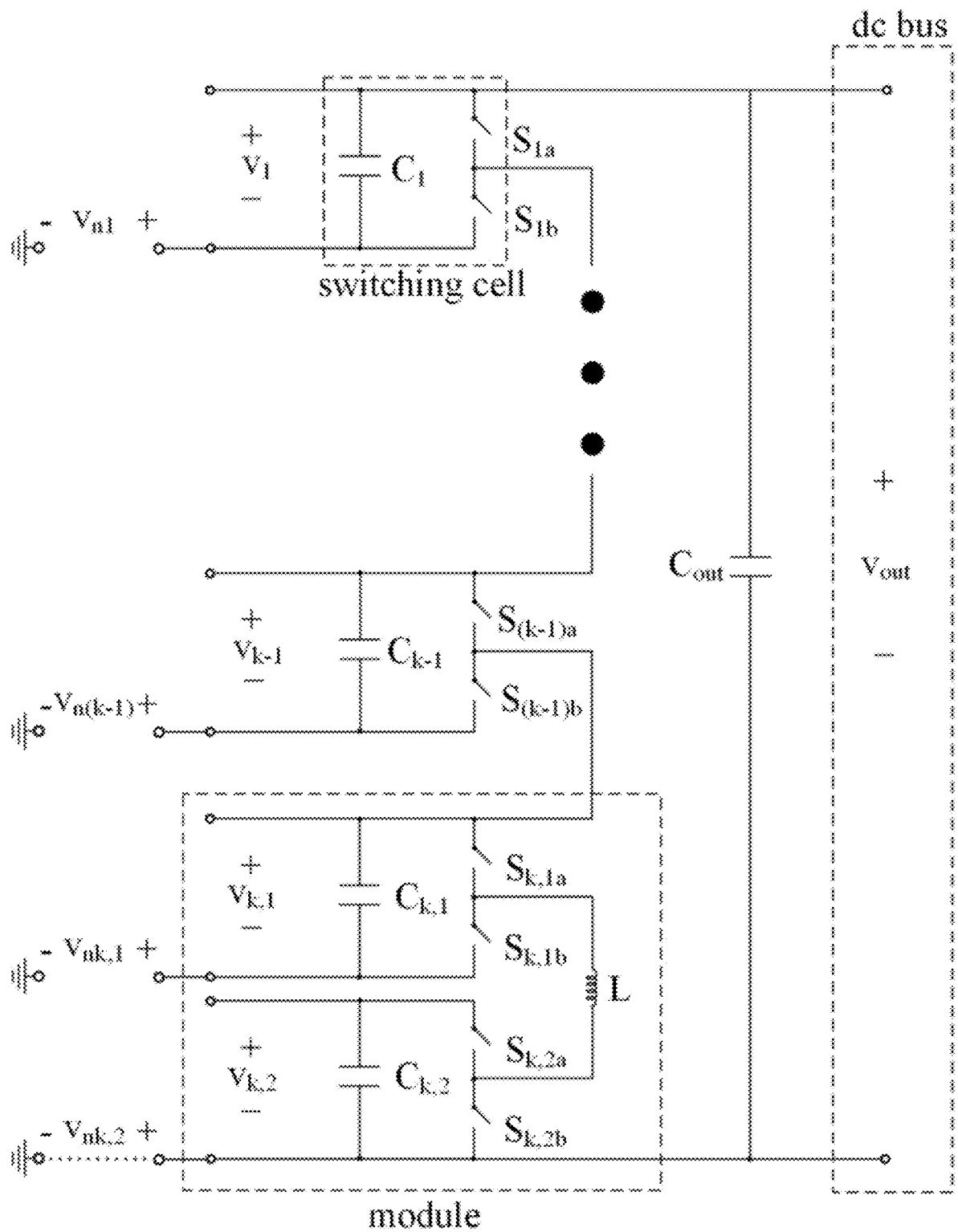
FIG. 6 (k+1)-input single-output cascaded converter structure where physical placements of the module and switching cell plurality are interchanged relative to FIG. 5.

Reference is now made to FIG. 6, where physical placement of the high/low-frequency cell stack and low-frequency cell stack are interchanged relative to FIG. 5.

The topology in FIG. 6 remains a (k+1)-input single-output cascaded converter structure. Apart from the physical ordering of low-frequency and high/low-frequency cell stacks within the string, this variant operates in a manner substantially similar to that of the structure of FIG. 5.

Full Output Voltage Range Capability

There is a practical restriction on the range of duty cycles a dc/dc converter can achieve. Namely, a converter is incapable of operating with a duty cycle very close to one, or very close to zero. Duty cycle commands within a small region above zero are in practice set to zero, while duty cycle commands within a small region below one are in practice set to unity. This practical limitation in the achievable range of duty cycles stems from the non-zero turn-on and turn-off times inherent to any semiconductor based power switching device. In addition, commercial PWM modules are typically incapable of modulating duty ratios very close to zero and one. It should be stressed the range of non-permissible duty cycles varies depending on many factors such as switch technology, switch voltage and current ratings, and switching frequency. In this work, particularly the simulations section, duty cycle commands less than 0.1 or greater than 0.9 are assumed to be unachievable for switch-mode operating cells. However, this range of values is chosen for illustrative purposes, only, and should be not considered as being typical.

The limitation in available range of duty cycles implies there is a range of average output voltages near zero, and a range of average output voltages near $V_{in}$, that a switch-mode dc/dc converter cannot achieve. In Zheng et al., it is explicitly highlighted that the adopted operational strategy utilizes only one converter cell for high-frequency switch-mode operation. The remaining cascaded buck converter cells operate deliberately in a low-frequency voltage stacking mode. This implies only one cell is available to synthesize the deficit portion of the reference output voltage not provided by the dedicated low-frequency buck converter cells. Thus, taking into consideration the practical limitation for realizable duty cycles as described above, the topology in Zheng et al. is unable to achieve all possible average output voltages. This stems from the fact the single dedicated switch-mode buck converter cell cannot achieve all duty cycle commands. This deficiency of prior art will be demonstrated in the simulations section.

In contrast to prior techniques, the cascaded topologies in FIG. 4 through FIG. 6 operate in such a manner that achieves all possible average output voltages for the entire cell stack. The effect of the aforementioned duty cycle restriction is alleviated by allowing at least one double-input single-output converter module, which corresponds to at least two buck converter cells as illustrated by FIG. 1, to operate in a switch-mode fashion as needed. The remaining cascaded cells need only operate in low-frequency voltage stacking mode. The key requirement is that, in order to accommodate all possible deficit portions of the reference output voltage not provided by the low-frequency cell stack, at least one module must be dedicated to switch-mode operation. Additional modules can operate as switch-mode converters, however, this is not required in order to achieve full output voltage range capability. This operational benefit will be demonstrated in the simulations section. It is important to reiterate the high/low-frequency cell stack is not limited to only one converter module, as shown by FIG. 5 and FIG. 6. Multiple modules can be cascaded while realizing the same benefit of full output voltage range capability.

Charge Balancing of Cells across all Possible Output Voltages

The cascaded converter structures in FIG. 4 through FIG. 6 can be used for many applications. In particular these topologies are well suited for battery systems. Individual batteries can be connected to the input ports along the entire cell stack, thus enabling their integration with a common dc link for bidirectional energy transfer.

An advantageous operational feature of the proposed cascaded dc/dc topologies for battery systems is that charge balancing of the different cells, i.e. individual batteries, can be achieved. Moreover, recalling the preceding discussion on output voltage range capability, the cascaded structures in FIGS. 4-6 can achieve this cell balancing across all possible output voltages. Cell balancing is defined in this context as a means to ensure each battery along the entire cell stack is charged/discharged at the same average rate. This is seen as a highly beneficial operating feature for battery energy management systems, as unequal charge depletion/repletion amongst the various batteries can be avoided. Cell balancing is achieved by suitable operation of the individual cells (ref. FIG. 4) or suitable coordinated operation of low-frequency and high/low-frequency cell stacks (ref FIGS. 5 and 6). Of course, long term (i.e. average) charge/discharge rates of individual batteries can deliberately be made unequal, if so desired.

Figure 7:
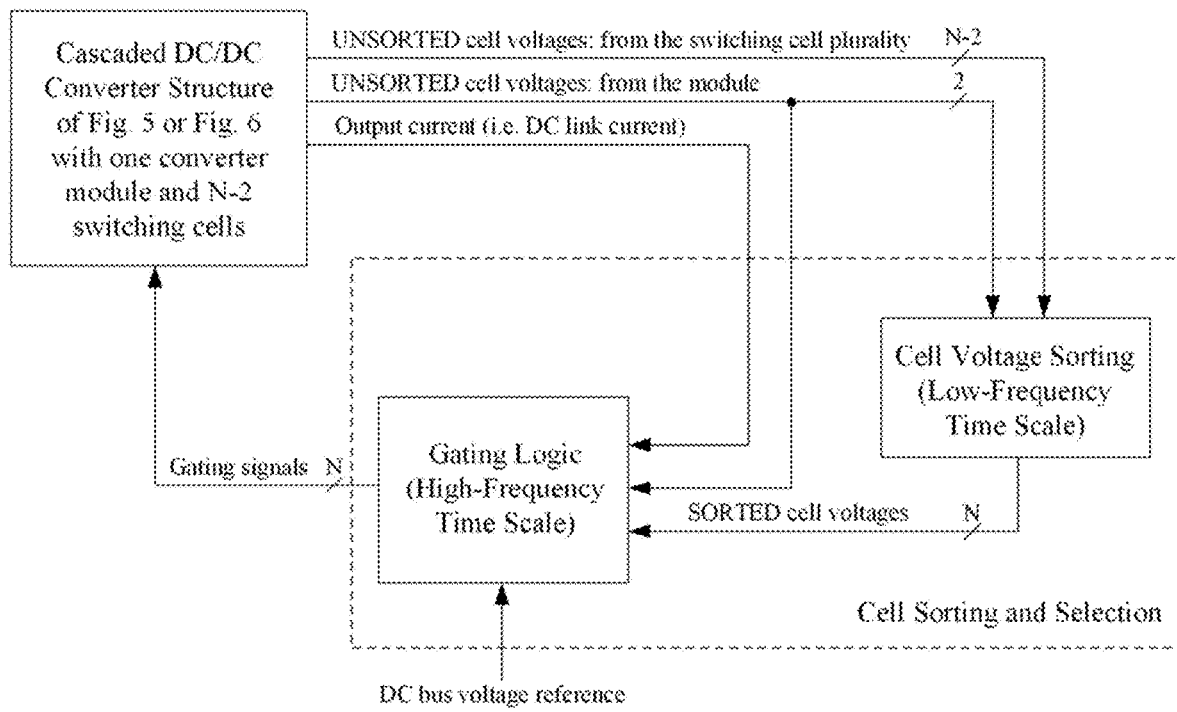
FIG. 7 One possible cell sorting and selection scheme for cascaded converter structures in FIG. 5 and FIG. 6 to achieve charge balancing of inputs across all possible output voltages.

Reference is now made to FIG. 7, which shows a high level diagram illustrating one possible operational strategy to achieve charge balancing between cells for the cascaded converter structures in FIG. 5 and FIG. 6, across all possible output voltages. Here it is assumed there are a total of N cells in the entire stack, with N−2 cells in the low-frequency cell stack (i.e. two cells in the module and N−2 cells in the switching cell plurality). As shown in FIG. 7, there exists a cell voltage sorting block and a gating logic block. The cell voltage sorting block acts on a "slow" time scale, corresponding to the switching period of the low-frequency cell stack, and sorts/orders all input ports based on their voltage measurements. The gating logic block acts on a substantially faster time scale, corresponding to the high-frequency switching period of the high/low-frequency cell stack, to allow at least one cell within the high/low-frequency cell stack to operate in switch-mode. As a result of this combination of slow and fast control, individual cells can be removed and inserted as needed to meet all possible stack voltage demands (i.e. output port voltage references), while simultaneously ensuring charge balancing between cells. The "output port voltage reference" command in FIG. 7 can be generated by various means, such as, for example, by the resulting control action of an external control logic block. An example application employing batteries is presented in the simulations section to illustrate this functionality.

It should be stressed that, as previously mentioned, the implementation in FIG. 7 is not unique. There are many other alternate implementations that can similarly achieve balancing between cells of the entire stack, by suitable operation of the high/low-frequency and low-frequency cell stacks.

Deployment

The double-input single-output dc/dc converter module shown in FIG. 1, along with the embodiments shown in FIG. 4 through FIG. 6, can be used to enable bidirectional (or, if desired, unidirectional) energy exchange between multiple inputs and a common output, wherein the output voltage can be significantly higher than individual input voltages. Such operation has wide range of application in systems such as, but not limited to, photovoltaic systems and battery management units. For example, individual photovoltaic panels that use centralized or distributed based maximum power point tracking schemes can be connected to input ports of a unidirectional variant of the cascaded topology shown in FIG. 4, thereby allowing maximal energy extraction from each panel (at its respective panel voltage) to a local load or external dc network.

Another example of application is to connect battery units to the input ports of the converter topology in FIG. 5 and FIG. 6 to enable centralized energy management of the battery system. The bidirectional energy exchange capability can be leveraged to allow individual battery units: 1) to supply energy to a load/source connected at the output or 2) to be charged by a dc source connected at the output. Furthermore, individual battery units can be inserted or removed from the battery stack, via appropriate switching action, thus allowing balanced charging and/or discharging of select battery units for all possible output voltages.

Converter Simulations: Introduction

In subsequent sections, the double-input single-output dc/dc converter module in FIG. 1 and the (k+1)-input single-output cascaded dc/dc converter structure in FIG. 5 are simulated using PLECS. Specific case study scenarios are simulated to demonstrate key operational characteristics of the converters. In addition, an example case study comparing performance of the converter module in FIG. 1 and prior art is carried out.

Simulation Results: Example Case Study Performance Comparison between Proposed Double-Input Single-Output Converter Module and Classical Two-Input Single-Output Cascaded Buck Converter The PLECS simulation model of the double-input single-output converter module of FIG. 1 is given in FIG. 8.

The nomenclature used in reference to FIG. 8 is summarized in Table 1.

TABLE 1

Nomenclature adopted for PLECS simulations involving Figure 8

| Quantity | Name |
| --- | --- |
| $V_{in}$ | Average voltage of input ports (i.e. average components of $V_1$ and $V_2$) |
| $V_{out}$ | Average voltage of output port (i.e. average component of $V_3$) |
| $I_{out}$ | Average current of output port (i.e. average component of $I_3$) |
| $T_s$ | Switching period |
| $D, D_1, D_2$ | Duty cycles |
| $\Phi$ | Phase shift (per-unit) between duty cycles |
| $\Delta v_{out,pp}$ | Peak-to-peak output voltage ripple of $V_3$ |
| $\Delta i_{out,pp}$ | Peak-to-peak output current ripple of $I_3$ |
| $\Delta v_{C,pp}$ | Equivalent single capacitor peak-to-peak voltage ripple |
| $\Delta i_{L,pp}$ | Equivalent single inductor current $I_L$ peak-to-peak ripple |
| $\Delta v_n$ | Voltage ripple of reference terminal voltage $v_{n1}$ |

Advantages of the double-input single-output converter module in FIG. 1 over the classical two-input single-output cascaded buck converter (i.e. two cascaded buck converter cells with associated filters) can be quantified by comparing them in an application example. Such an application example is now considered, which consists of an energy management system having two equal battery voltages of $V_{in}$=60V (i.e. two inputs of 60V nominal rating) with an output voltage requirement of $V_{out}$=90V and $I_{out}$=10A. This corresponds to a power transfer of approx. 900 W. Equal energy storage requirements (of inductors and capacitors) and operating conditions are imposed on the converter module in FIG. 1 and the classical cascaded buck converter. These imposed conditions allow key performance criteria of the topologies to be compared directly. The performance criteria of interest for this example case study are: 1) losses, 2) capacitive current to ground, and 3) harmonic distortion.

The following metric is proposed to evaluate converter performance $$\text{Metric} \stackrel{\text{def}}{=} \Delta i_{L,pp} \cdot \Delta v_n \quad (7)$$

In order to reduce converter losses, capacitive current to ground and total harmonic distortion, it is necessary to reduce both $\Delta i_{L,pp}$ and $\Delta v_n$ simultaneously. In other words, a "better" converter will have smaller $\Delta i_{L,pp}$ and $\Delta v_n$ values, and thus a smaller metric score constitutes a preferred converter structure based on the considered performance criteria.

FIG. 8 shows the PLECS simulation circuit for the double-input single-output converter module in FIG. 1. In all simulations, the switching period $T_s$ is set equal to 16.67 μs for all switches. The inductor L is 125 μH, and capacitor $C_3$ is implemented by connecting two 0.926 μF capacitors in series as shown. This is done to ensure fairness of the comparison, as the simulation model for prior art utilizes two capacitors of 0.926 μF each and two inductors of 62.5 μH each. The sizing of energy storage components is chosen based on inductor current ripple and capacitor voltage ripple considerations for the prior art. Based on these parameters, the converter module in FIG. 1 (and also FIG. 8) and the classical cascaded buck converter have equal inductive and capacitive energy storage requirements. Moreover, this also ensures equal operating conditions for both topologies.

Figure 9:
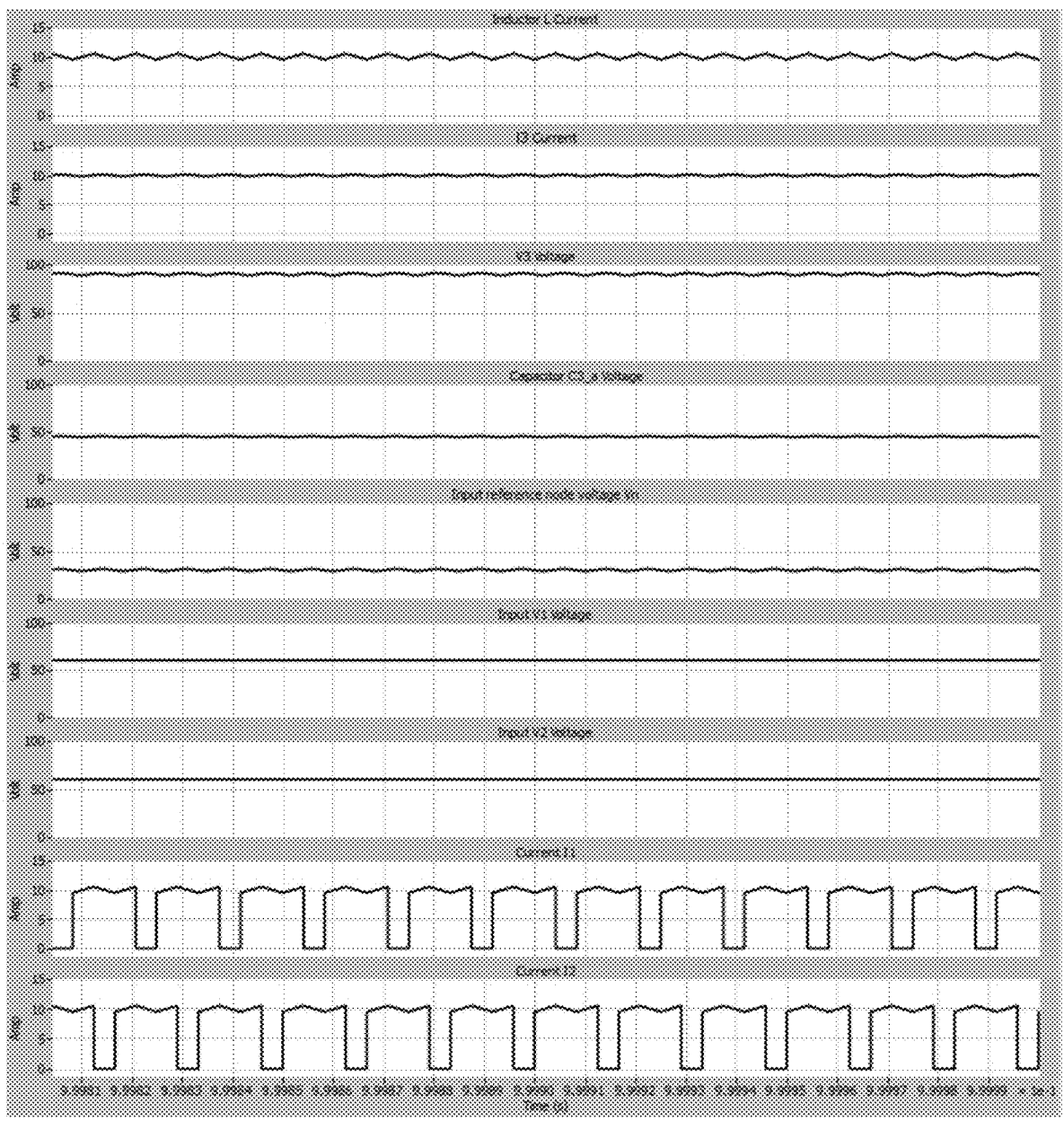
FIG. 9 Simulation results for double-input single-output converter module in FIG. 1: power transfer from inputs to output.

A comparative case study is carried out for the two topologies as described above. Reference is now made to FIG. 9, which presents simulation results for the double-input single-output converter module in FIG. 1, where power transfer is approx. 900 W from input ports to output port. The depicted waveforms were obtained using the simulation model in FIG. 8.

A summary of the case study simulation results comparing the two converter topologies is tabulated in Table 2. The classical series-cascading of buck converter cells as employed by prior art results in equal duty cycle commands: $D_1$=$D_2$=0.75. However, to achieve the same operating point, the double-input single-output converter module in FIG. 1 employs unequal duty cycles: $D_1$=0.25 and $D_2$=0.75. This is due to the imposed switches arrangement and chosen convention of duty cycle commands, as illustrated in FIG. 3A.

It should be noted that a set of optimal $\Phi$, $D_1$ and $D_2$ can be found to minimize $\Delta i_{L,pp}$ and $\Delta v_n$ for FIG. 1 and prior art separately.

TABLE 2

Summary of case study simulation results comparing performance of double-input single-output converter module in FIG. 1 (and also FIG. 8) and classical cascaded buck converter (prior art)

| | $\Phi$ | $V_{out}$(V) | $I_{out}$(A) | $\Delta v_{out,pp}$(V) | $\Delta i_{out,pp}$(A) | $\Delta v_{C,pp}$(V) | $\Delta i_{L,pp}$(A) | $\Delta v_n$(V) |
| --- | --- | --- | --- | --- | --- | --- | --- | --- |
| FIG. 1 | 0 | 90.2 | 9.96 | 8.58 | 0.954 | 4.29 | 2.12 | 8.53 |
| $D_1$ = 0.25 | $0.25 T_{sw}$ | 90.0 | 9.99 | 2.23 | 0.247 | 1.11 | 1.02 | 2.23 |
| $D_2$ = 0.75 | $0.50 T_{sw}$ | 90.5 | 9.97 | 8.56 | 0.951 | 4.28 | 2.15 | 8.56 |
| Prior art | 0 | 90.1 | 9.99 | 12.6 | 1.41 | 6.32 | 3.17 | 6.31 |
| $D_1$ = 0.75 | $0.25 T_{sw}$ | 90.2 | 9.96 | 8.58 | 0.953 | 35.4 | 5.68 | 35.3 |
| $D_2$ = 0.75 | $0.50 T_{sw}$ | 90.0 | 10.01 | 2.22 | 0.246 | 26.6 | 2.92 | 26.4 |

Table 3 compares the computed values of performance metric (7) for FIG. 1 and prior art, based on the case study results summarized in Table 2. It can be seen from Table 3 that the double-input single-output converter module in FIG. 1 achieves a better metric score in comparison to the classical cascaded buck converter, for all values of $\Phi$. This implies FIG. 1 is the preferred topology for the considered performance criteria.

Figure 20:
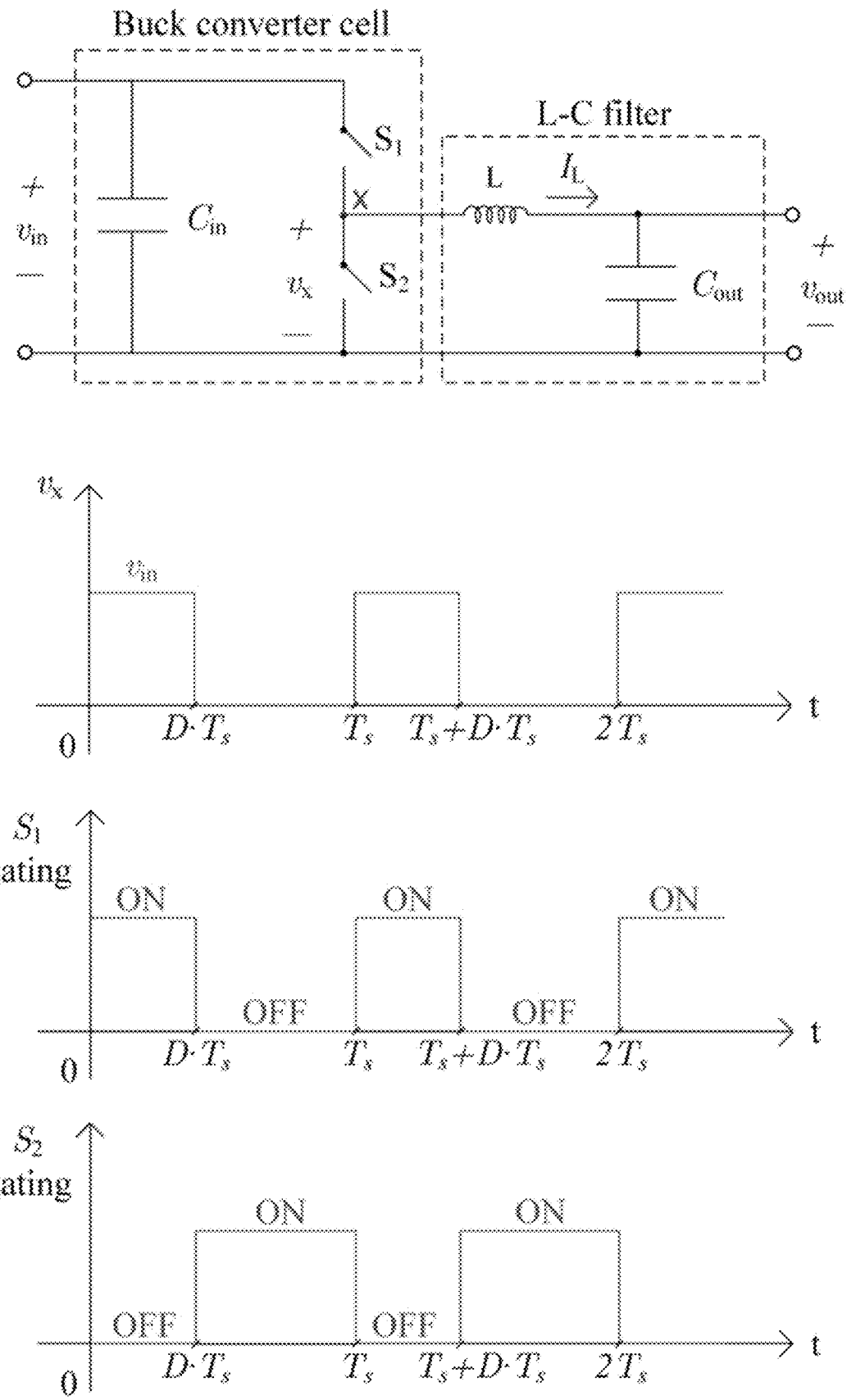
Figure 21:
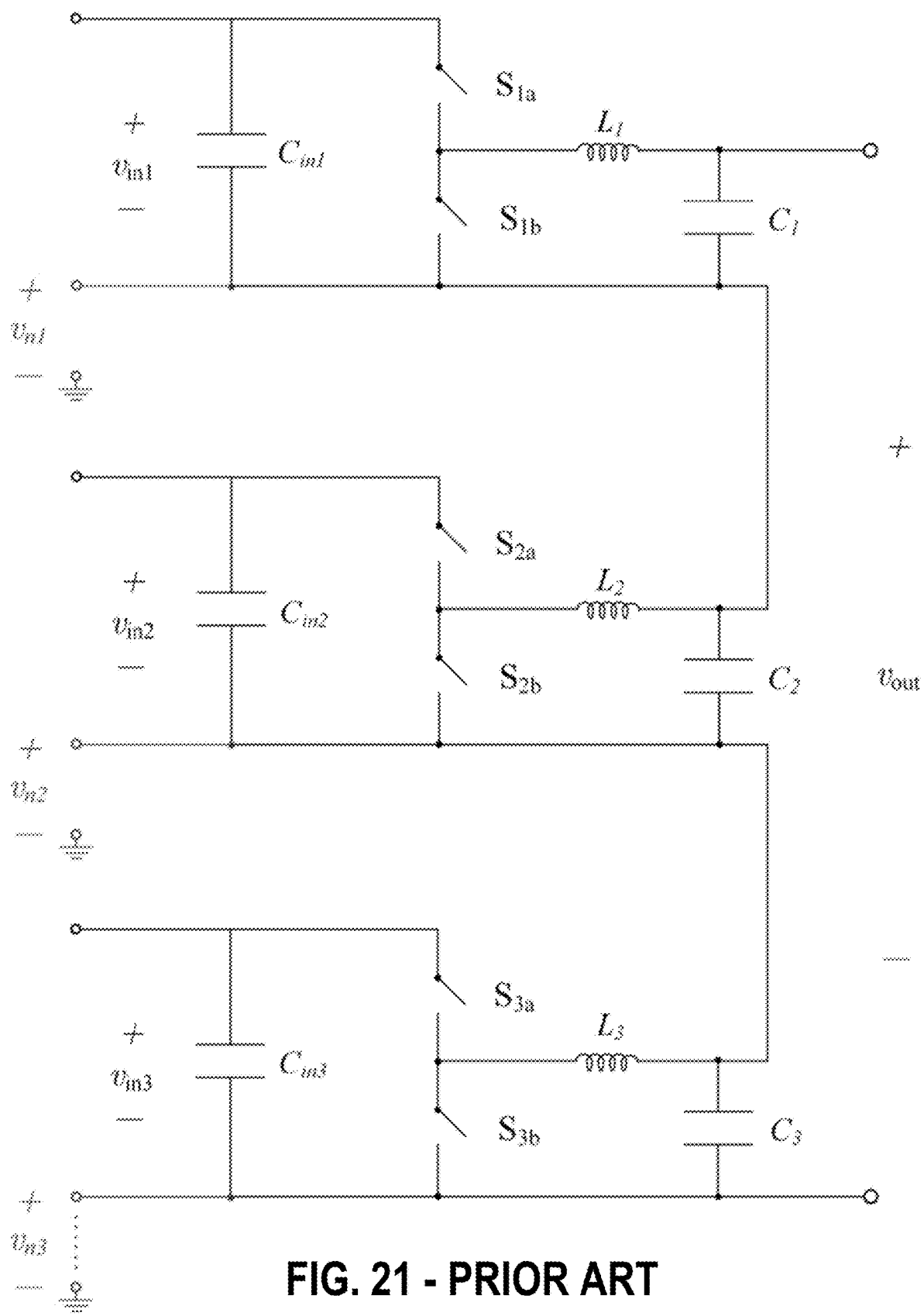
FIG. 21 Prior art: Classical cascaded buck converter with multiple L-C output filters, where three buck converter cells are employed for ease of illustration.
Figure 22:
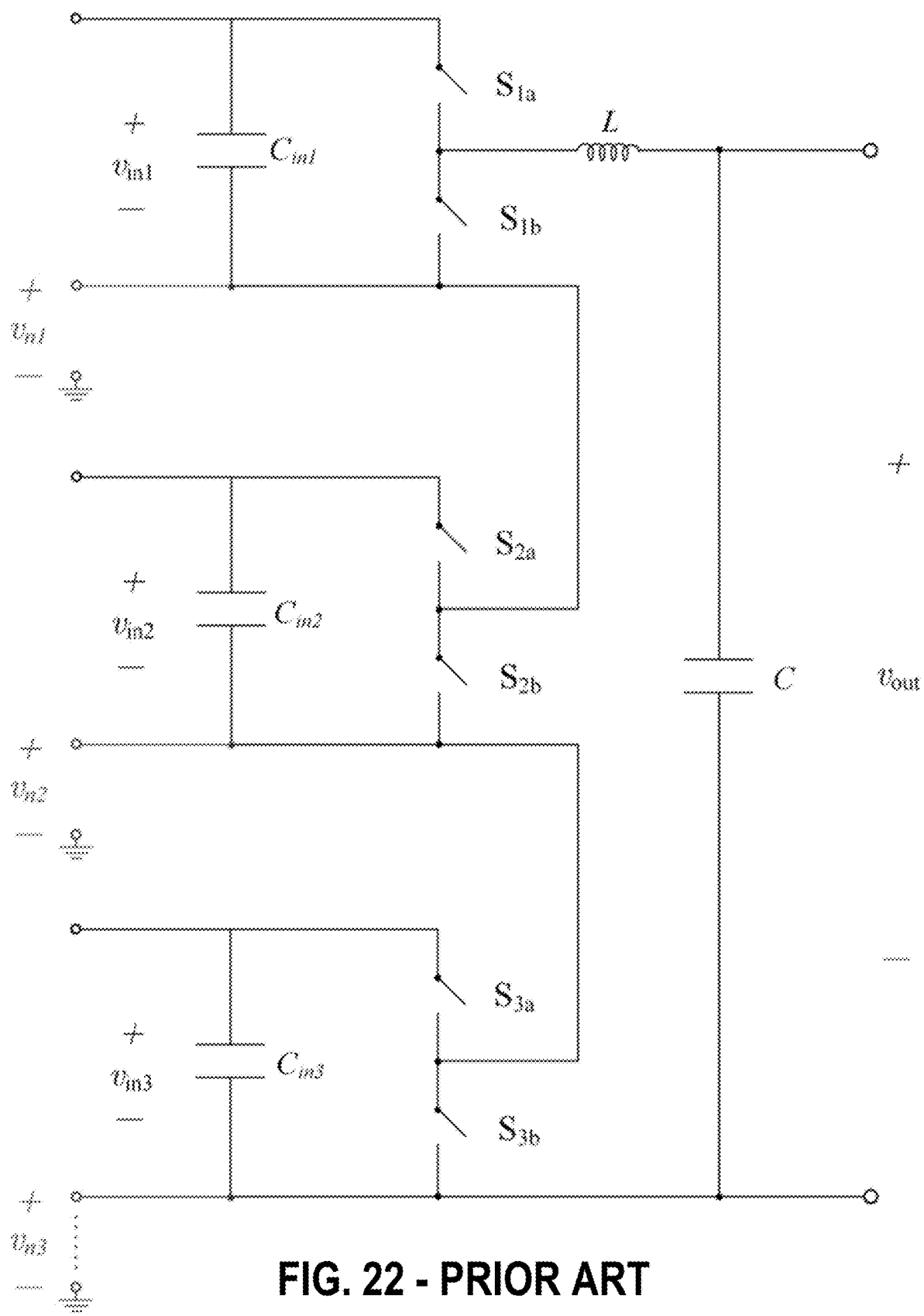
FIG. 22 Prior art: Cascaded buck converter with a single shared L-C output filter, where three buck converter cells are employed for ease of illustration.

It is important to recognize the optimal value of $\Phi$ for each converter topology, which is defined in this example as the $\Phi$ value corresponding to the lowest metric score in Table 3, is 2.27 for FIG. 1 and 20.03 for prior art. For these optimal conditions, the double-input single-output dc/dc converter module has a far superior performance (as metric score is approx. 10 times lower) and therefore outperforms the classical cascaded buck converter.

TABLE 3

Summary of key simulation results for converter module
and classical cascaded buck converter (prior art)

|  | Φ | Figure 1 | Prior art |
|---|---|---|---|
| Metric | 0 | 18.2 | 20.03 |
|  | $0.25\ T_{sw}$ | 2.27 | 201.07 |
|  | $0.50\ T_{sw}$ | 18.4 | 77.67 |

It should be stressed that a case study comparison between the double-input single-output converter module in FIG. 1 and cascaded buck converter with single L-C output filter (i.e. Zheng et al.) is not carried out, due to the very large high frequency switching voltage ripple that naturally occurs with the latter. In this case, use of Zheng et al. would result in a $\Delta v_n$ of 60 V, which implies computed values of metric (7) that far exceed those summarized in Table 3.

Simulation Results: Power Transfer from Output Port to Input Ports of Single Converter Module The previous simulations imposed dc power transfer from inputs to output. Additional simulations are now performed to demonstrate the dc/dc converter topology in FIG. 1 is capable of bidirectional energy exchange, i.e. power transfer from inputs to output and vice versa. Moreover, power sharing between input ports is also demonstrated via simulation.

Two additional simulations are performed for FIG. 1 to illustrate dc power transfer from output port to input ports. Specifically, these two simulated scenarios show that an energy source located at the output transfers 900 W to the inputs, and power sharing among the input ports can be controlled. Power sharing in this context implies the total power transfer can be arbitrarily split between input ports.

Figure 10:
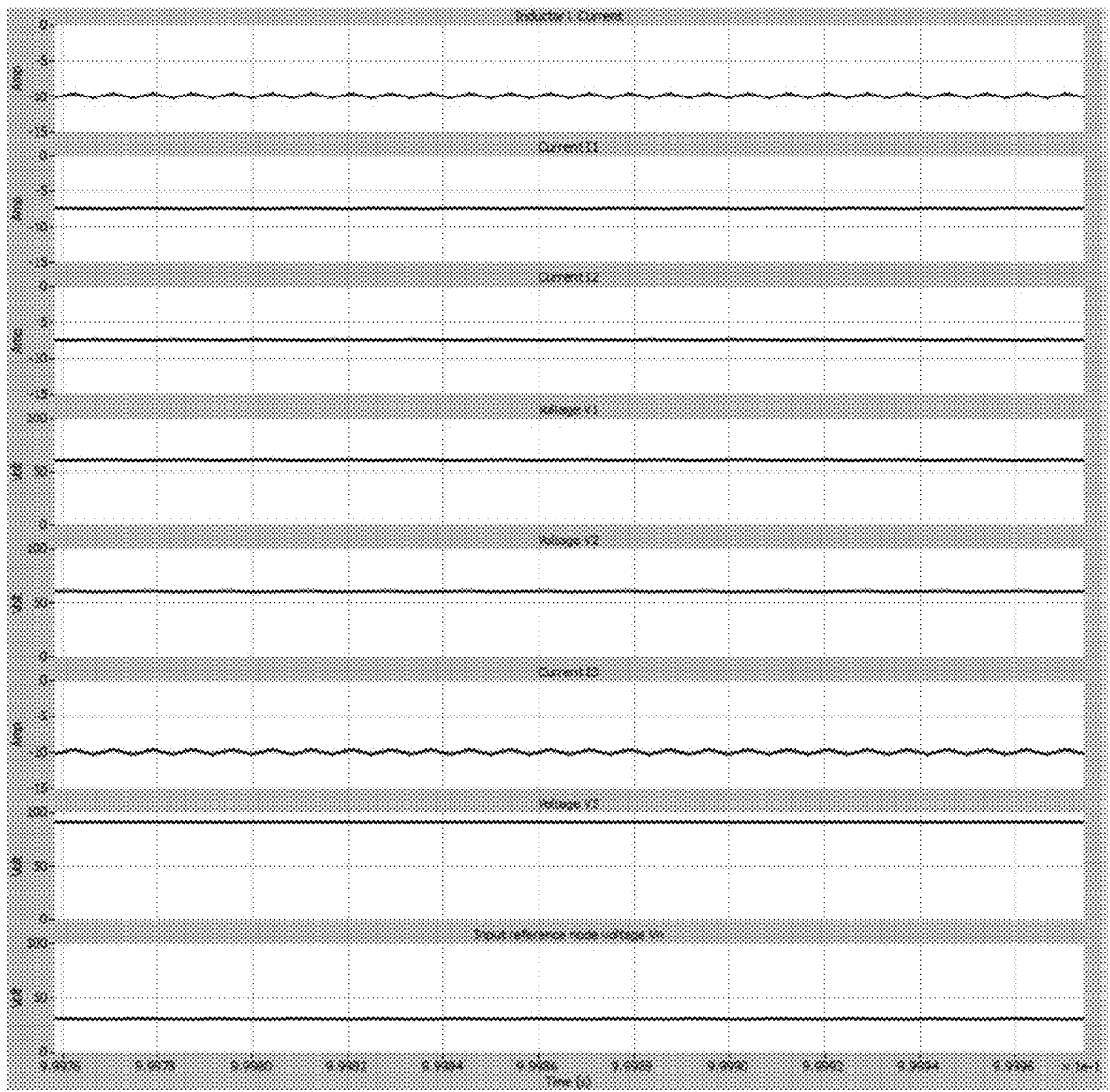
FIG. 10 Simulation results for double-input single-output converter module in FIG. 1: power transfer from output to inputs, where power transfer is divided evenly between input ports.
Figure 11:
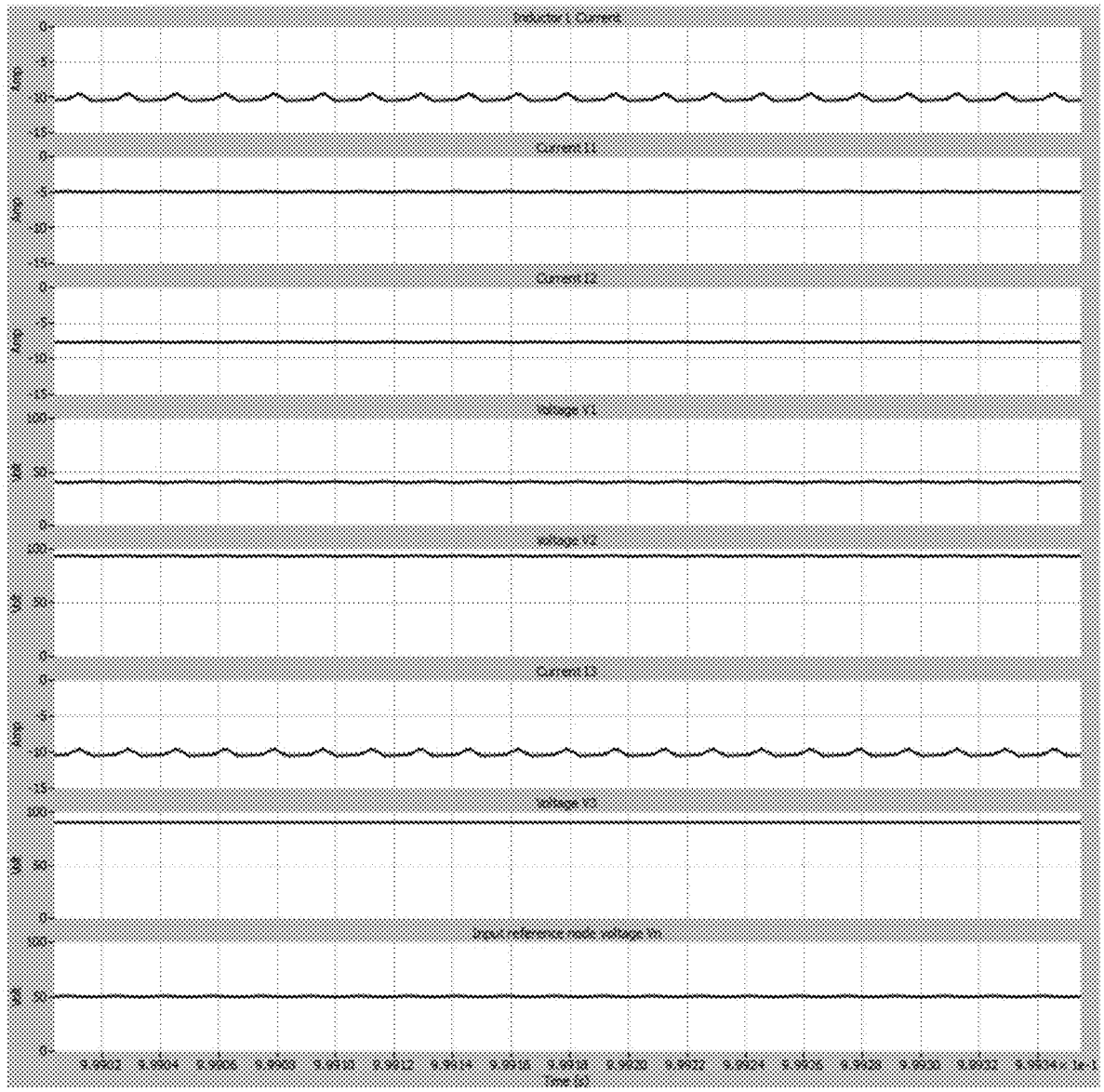
FIG. 11 Simulation results for double-input single-output converter module in FIG. 1: power transfer from output to inputs, where power transfer is divided unevenly between input ports as assigned by the user.

FIG. 10 presents the simulated waveforms for power transfer from output to inputs where the power is shared equally among the two input ports. FIG. 11 presents the simulated waveforms for power transfer from output to inputs where the power is shared unequally among the two input ports, as assigned by the user.

Simulation Results: Realize Full Output Voltage Range for Cascaded Converter Structure of FIG. 5

Simulations are provided to demonstrate the achievable output voltage range for Zheng et al. in relation to the proposed topology in FIG. 5. The simulation models are implemented in PLECS and correspond to: 1) four series-cascaded two-quadrant dc/dc buck converter cells with single L-C output filter (Zheng et al.), and 2) a four-input single-output cascaded dc/dc converter structure of FIG. 5 (i.e. k=3). Each converter structure has four batteries connected at the input terminals, where each battery has a nominal potential of 10 V. Thus, the possible range of output voltages is 0 to 40 V. It should be reiterated the former has one buck converter cell dedicated to switch-mode operation while the latter employs one converter module (comprising two buck converter cells) for possible switch-mode operation. The remaining converter cells in each topology operate exclusively in low-frequency voltage stacking mode. As stated previously, it is assumed that duty cycle commands less than 0.1 or greater than 0.9 are unachievable.

Figure 12:
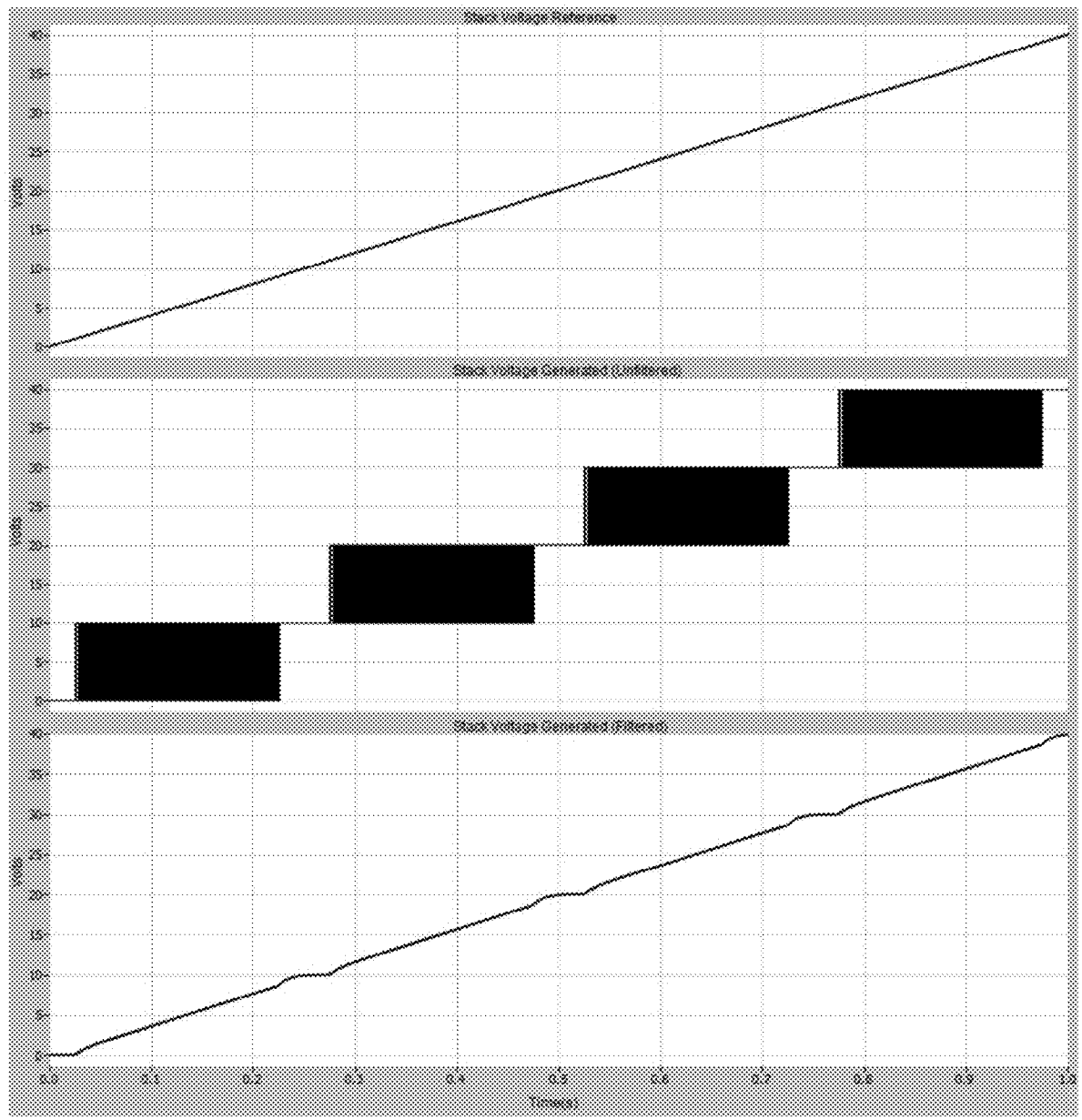
FIG. 12 Simulation results for prior art comprising four series-cascaded two-quadrant buck converter cells with single L-C output filter (i.e. a four input variant of FIG. 22), to demonstrate inability to achieve full output voltage range when only one of the cells utilizes switch-mode operation.

FIG. 12 shows both the filtered and unfiltered average output voltage (i.e. "stack voltage") corresponding to prior art, for all possible output voltage references. Here one converter cell operates as a switch mode converter at any given time, while the remaining three cells are inserted as necessary to build up to the desired stack voltage. Observe the three regions in the lower plot of FIG. 12 that exhibit a "flat" voltage profile. This output response is a direct result of the duty cycle limitation of the switch-mode operating cell as described previously. This simulation result clearly shows that prior art is incapable of achieving a continuous output voltage profile. The converter cannot provide certain output voltages as shown, and therefore its operating range must be restricted to avoid these undesirable operating regions. Alternatively a rapid sorting of the cell voltages could address the problem, however, the cells pre-designated for low-frequency operation could no longer be considered as operating exclusively as such.

Figure 13:
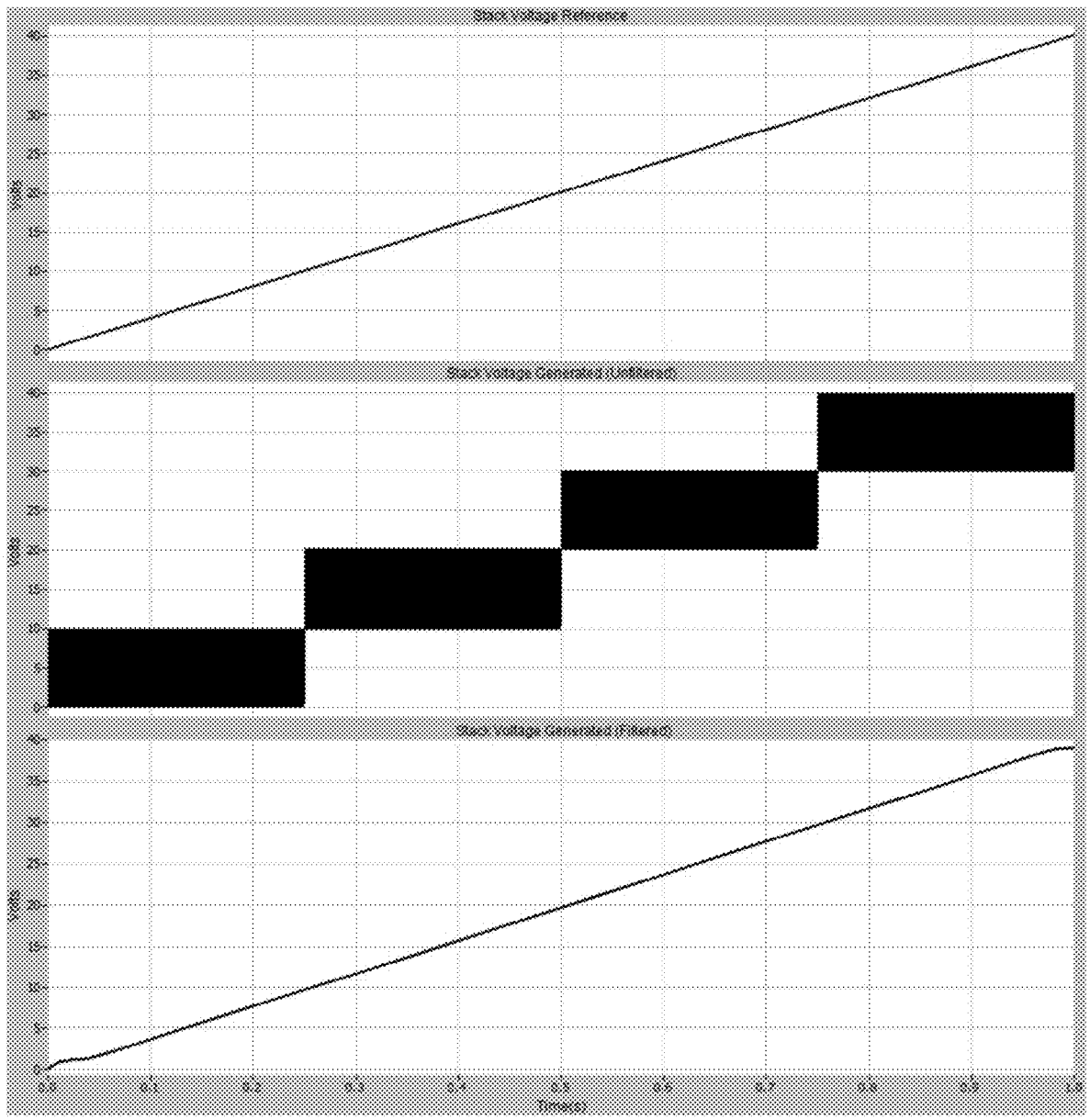
FIG. 13 Simulation results for a four-input single-output cascaded converter structure of FIG. 5, to demonstrate ability to achieve full output voltage range when utilizing switch-mode operation for the high/low-frequency cell stack.

FIG. 13 shows both the filtered and unfiltered average output voltage (i.e. "stack voltage") corresponding to the four-input single-output structure of FIG. 5, for all possible output voltage references. Individual cells within the high/low-frequency cell stack operate as switch-mode converters when needed, and cells within the low-frequency cell stack operate exclusively in voltage stacking mode. The lower plot in FIG. 13 clearly demonstrates the topology of FIG. 5 is capable of achieving a continuous output voltage profile. Thus, in comparison to prior art, the proposed topology can achieve better utilization of available cell voltage in achieving the full output voltage range.

Figure 14:
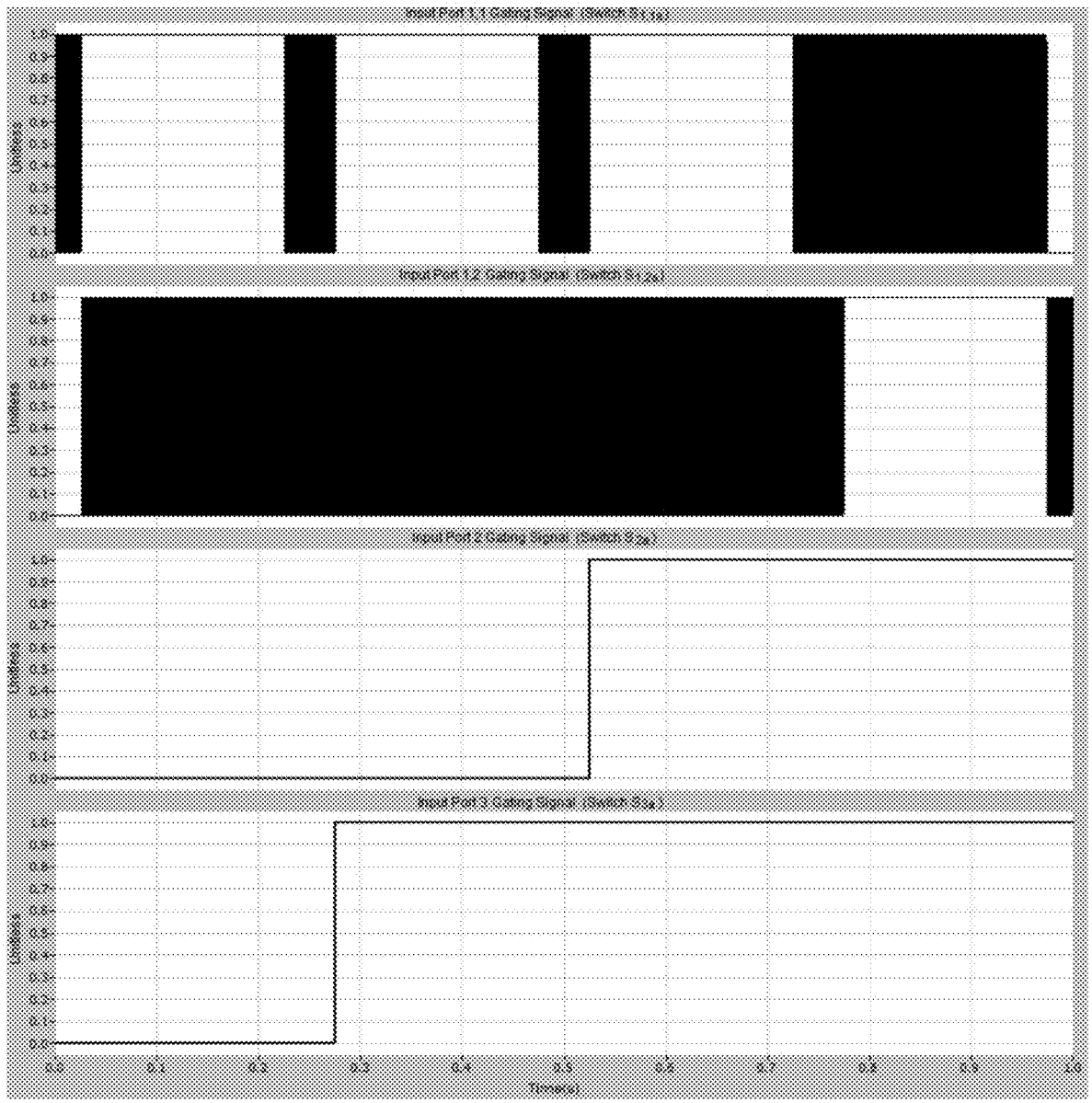
FIG. 14 Switch gating waveforms for simulation results in FIG. 13, where high-frequency cells are switched at 50 kHz.
Figure 15:
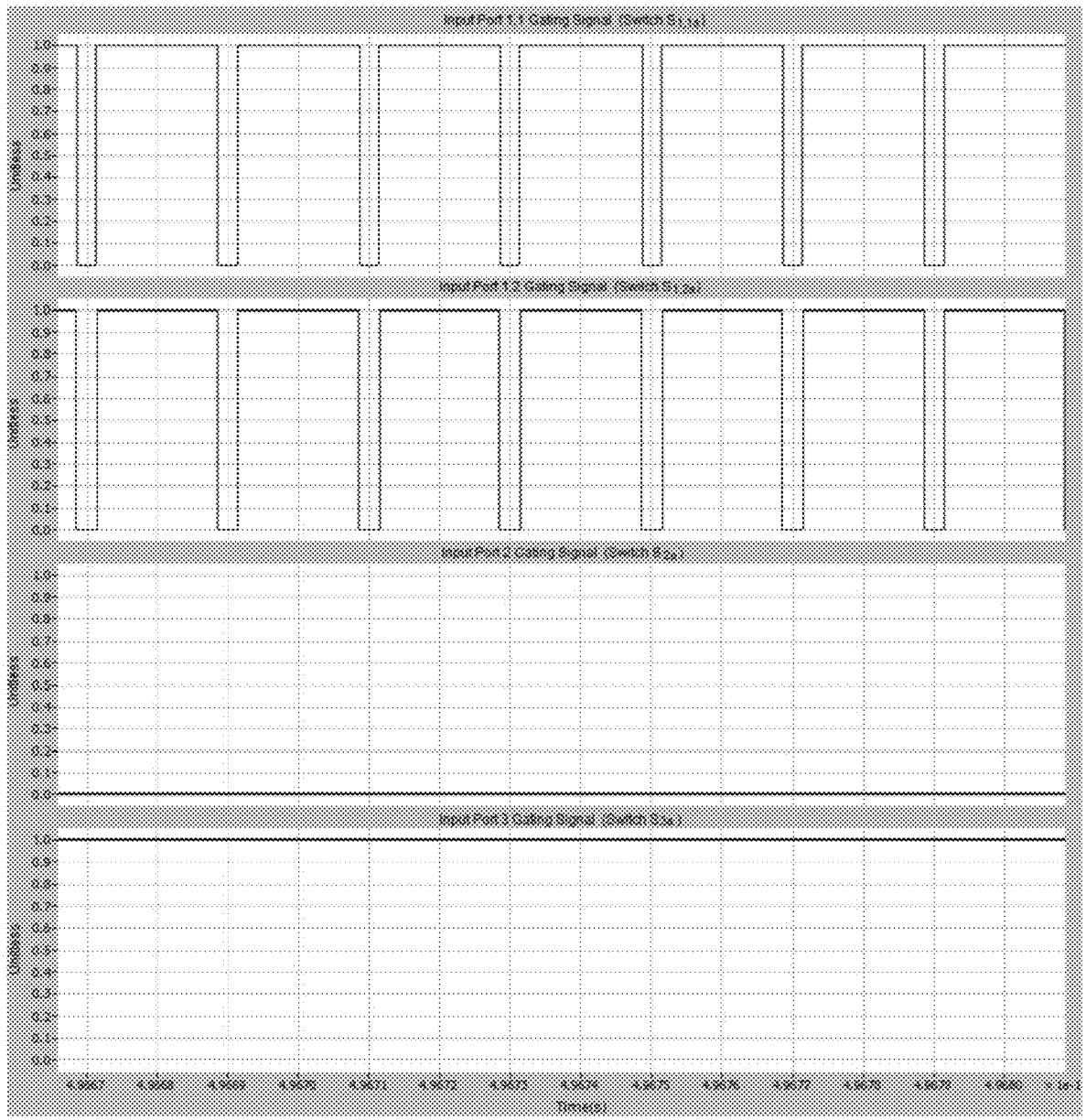
FIG. 15 Finer time scale resolution (i.e. zoomed time axis) for a chosen segment of simulated waveforms in FIG. 14, to show contrast between high-frequency and low-frequency switching times.

FIG. 14 shows gating signals for the individual converter cells of FIG. 13. FIG. 15 shows a finer resolution time scale for a chosen segment of simulated waveforms in FIG. 14, to show contrast between high-frequency and low-frequency switching times.

Simulation Results: Charge Balancing of Cells for Cascaded Converter Structure of FIG. 5

Simulation results are provided to demonstrate the capability for cell balancing in FIG. 5 based on the operation strategy depicted in FIG. 7. These PLECS simulations utilize the same case study system as utilized in the previous simulation section. That is, a four-input single-output realization of FIG. 5 is modeled in PLECS with four integrated batteries, where each battery has a nominal potential of 10 V.

Figure 16:
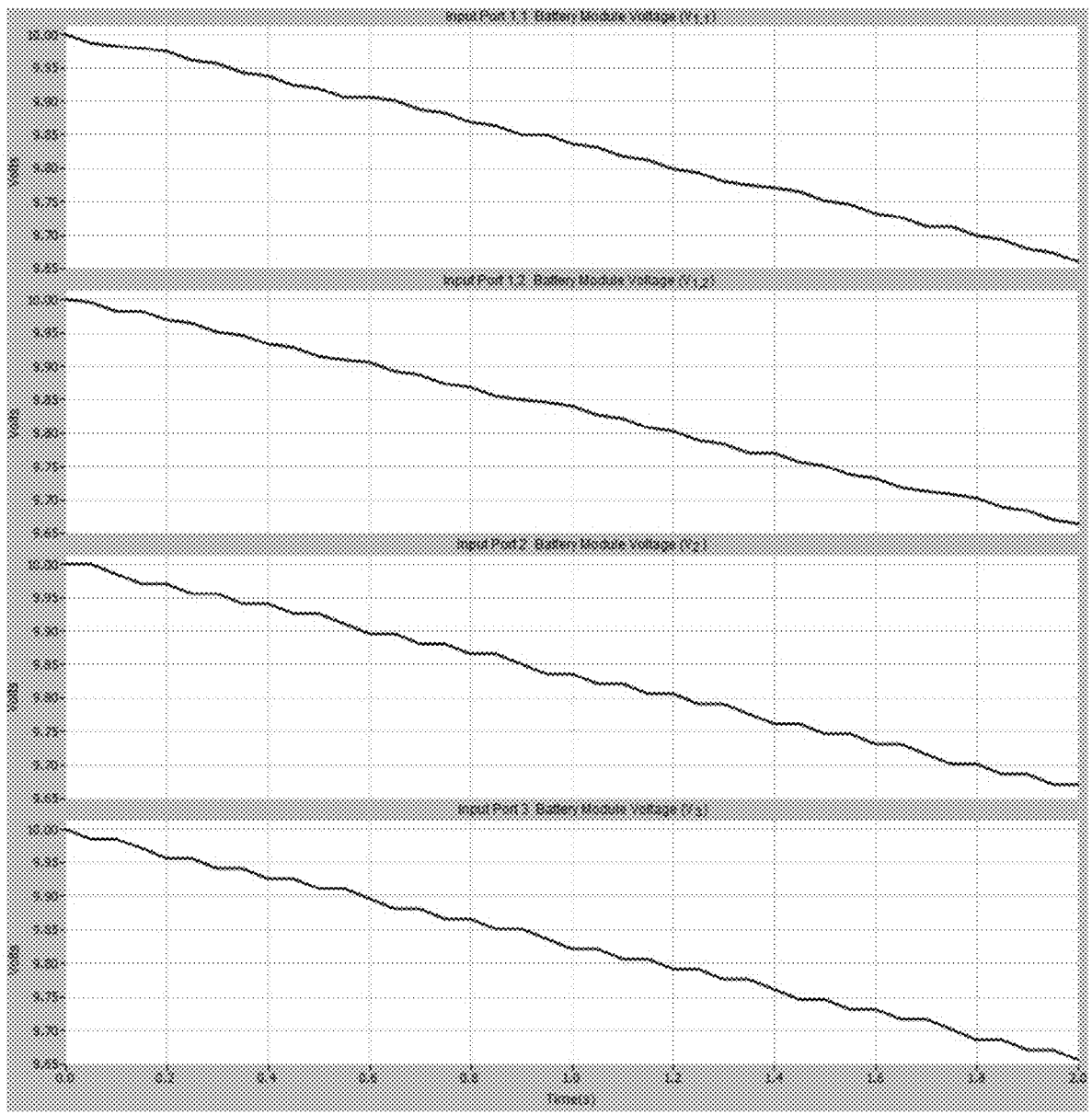
FIG. 16 Simulation results for a four-input single-output cascaded converter structure of FIG. 5 employing battery modules, to illustrate mechanism allowing equal charge balancing between input ports such that the average battery voltages are depleted at the same rate.

FIG. 16 plots the four battery voltages as a fixed amount of dc power is transferred to the converter output terminals. Observe the state-of-charge of all four batteries is depleted at the same average (i.e. long-term) rate. This charge balancing between cells is achieved by utilizing the operational strategy conceptualized in FIG. 7. Although implemented as a case study example for FIG. 5, this same functionality can be implemented for FIG. 4 and FIG. 6 (or any variants thereof). Recall cell balancing can be achieved across all possible output voltages, which is not possible using prior art.

Figure 17:
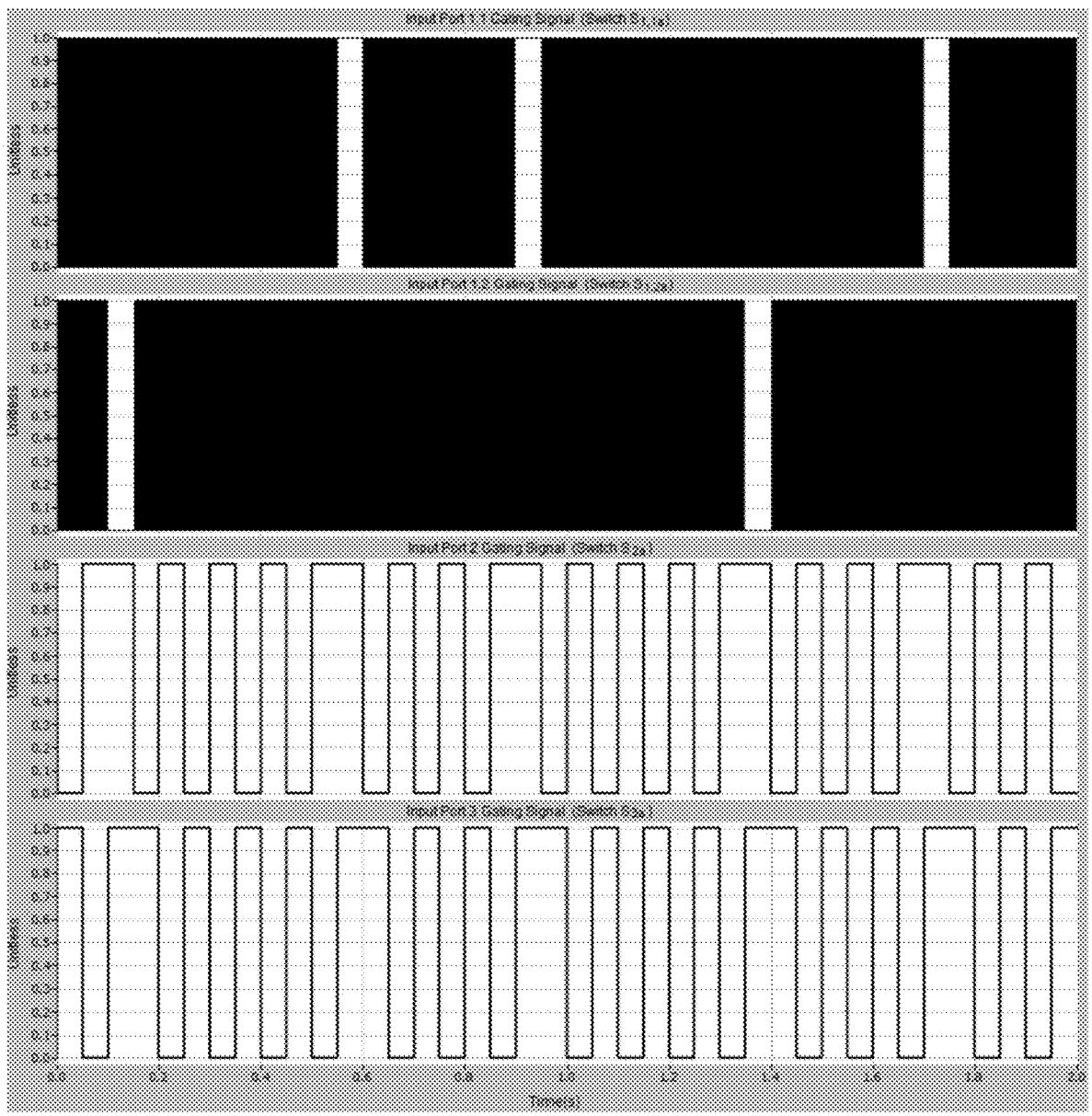
FIG. 17 Switch gating waveforms for simulation results in FIG. 16, where high-frequency cells are switched at 50 kHz and low-frequency cells are switched at 20 Hz.
Figure 18:
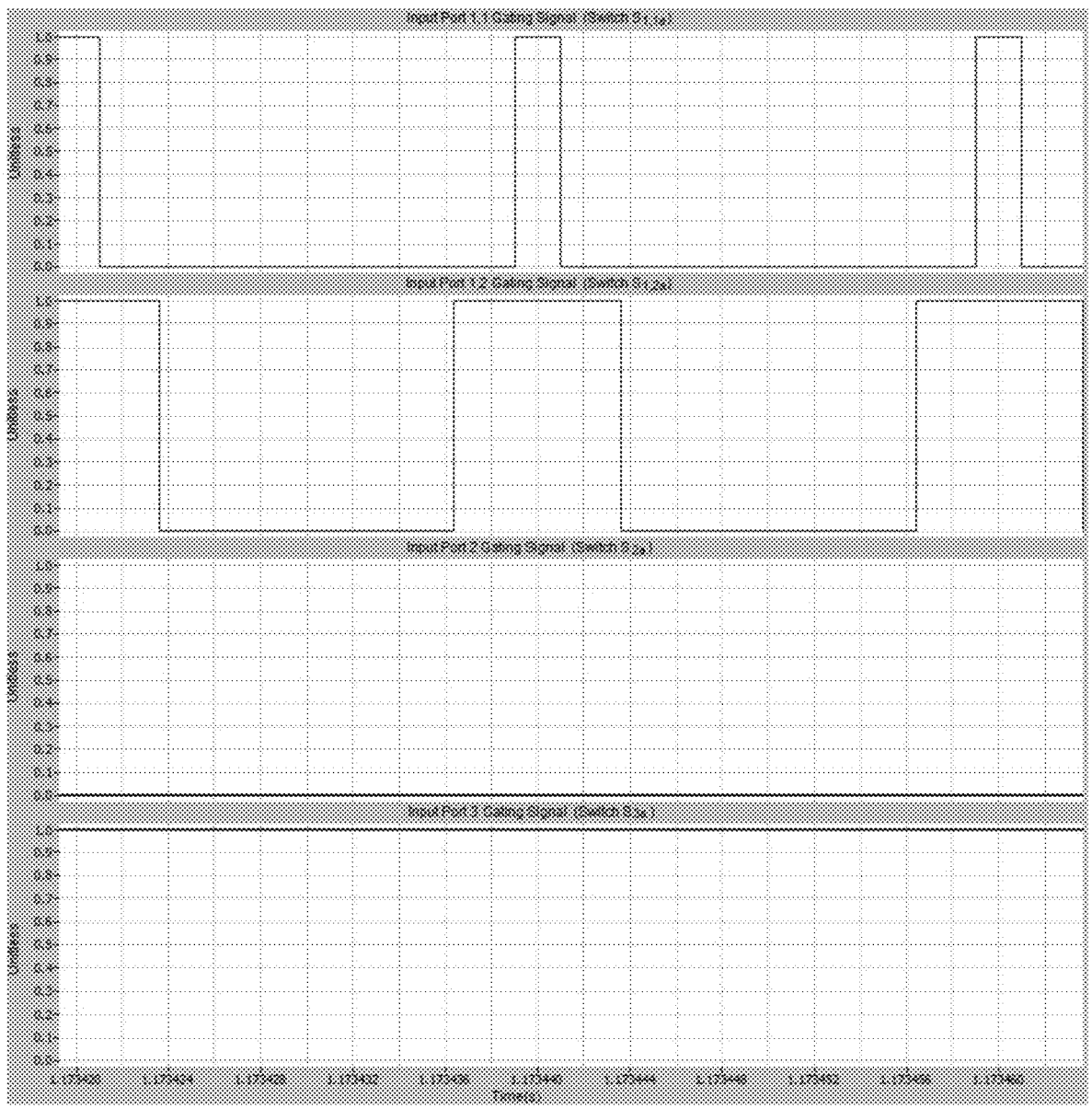
FIG. 18 Finer time scale resolution (i.e. zoomed time axis) for a chosen segment of simulated waveforms in FIG. 17, to show contrast between high-frequency and low-frequency switching times.

FIG. 17 shows gating signals for the individual converter cells of FIG. 16. FIG. 18 shows a finer resolution time scale for a chosen segment of simulated waveforms in FIG. 17, to show contrast between high-frequency and low-frequency switching times.

Variations

Figure 19:
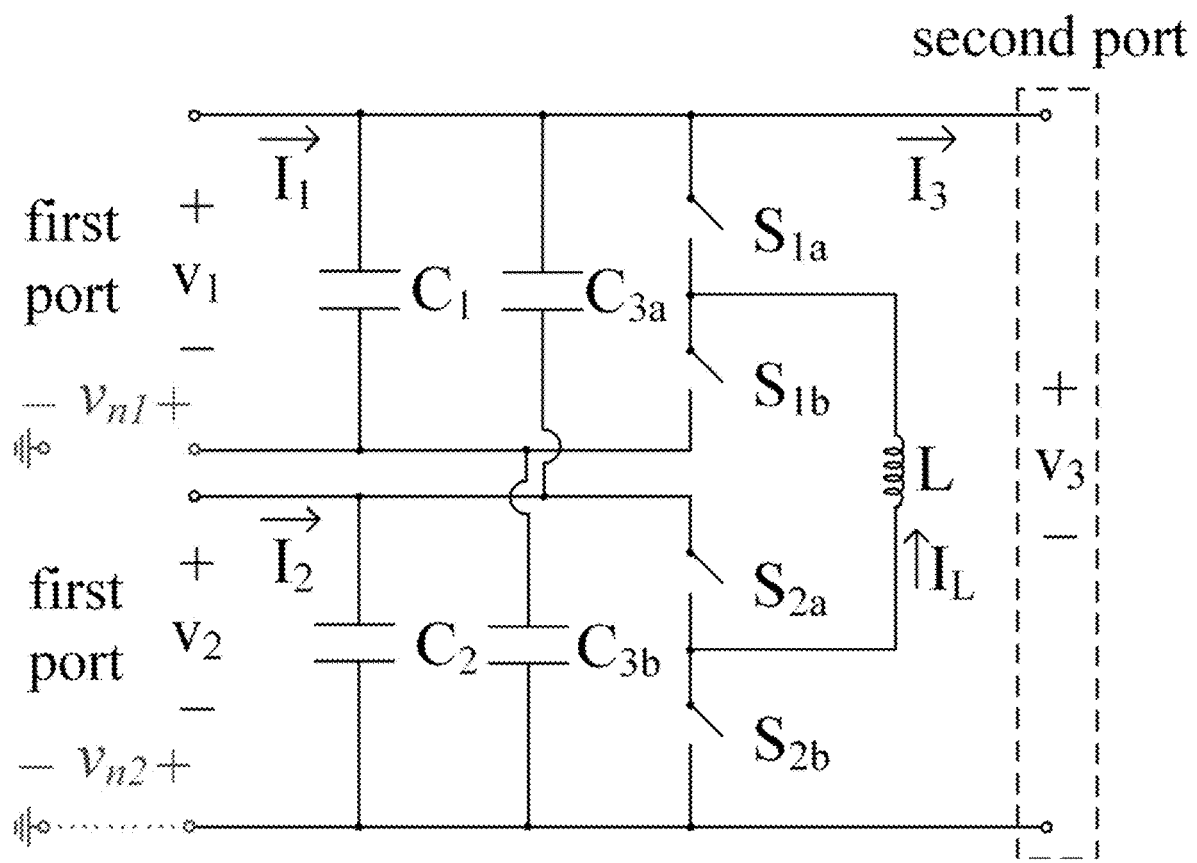
FIG. 19 Double-input single-output converter module with functionally similar output capacitor configuration FIG. 20 Prior art: Two-quadrant buck converter with output filtering, depicted along with corresponding operational waveforms.

Whereas specific embodiments of the invention have been discussed, variations are possible. For example, FIG. 2 shows one possible implementation of the two pairs of complimentary switches using MOSFETs and Diodes, however, the switches can be implemented using a number of different switching devices and technologies, and, similarly, energy storage components (i.e. inductors and capacitors) can also be implemented with equivalents. For example, the placement of capacitors $C_{3a}$ and $C_{3b}$ in FIG. 19 can be employed as an alternate output capacitor configuration. All of these variations should be considered as functionally similar. It is also possible to realize unidirectional variants of the presented bidirectional topologies, by suitable implementation of the switching devices.

Furthermore, FIG. 4 through FIG. 6 are examples of cascaded topologies derived based on the converter module of FIG. 1 and series-cascaded buck converter cells. As there are many other possible functionally similar realizations of cascaded converter structures using the basic building block in FIG. 1, the illustrated embodiments should not be considered as limiting. Furthermore, the two-quadrant buck converter cell is explicitly employed in all topologies, however, this is not essential. Other types of dc/dc converter cells may be employed, for example, buck or boost converter cells.

Whereas specific operating conditions and parameters are disclosed as part of the simulations and others, persons of ordinary skill will understand that these are included for illustration, only, and are not intended to be limiting.

Figure 23:
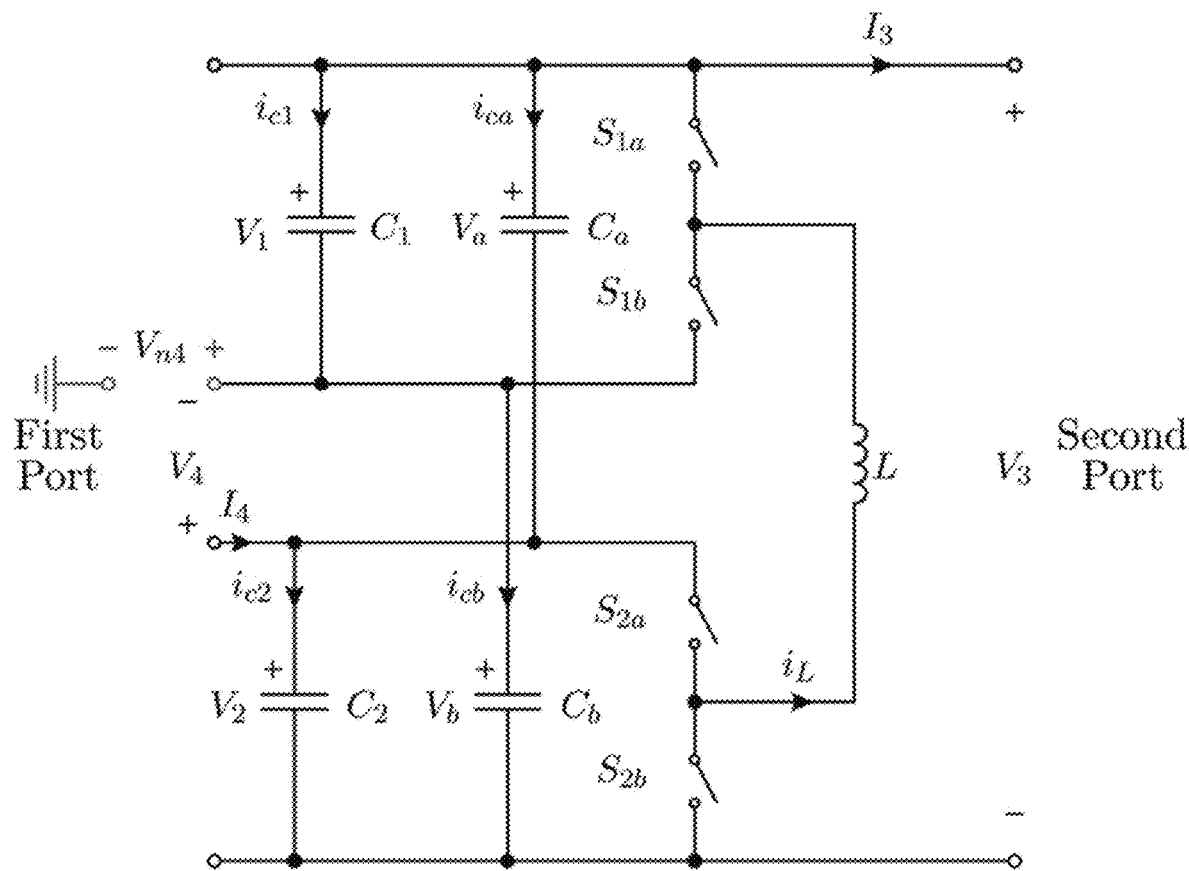
FIG. 23 Single-input single-output application of the converter module, using the functionally similar output capacitor configuration.
Figure 24A:
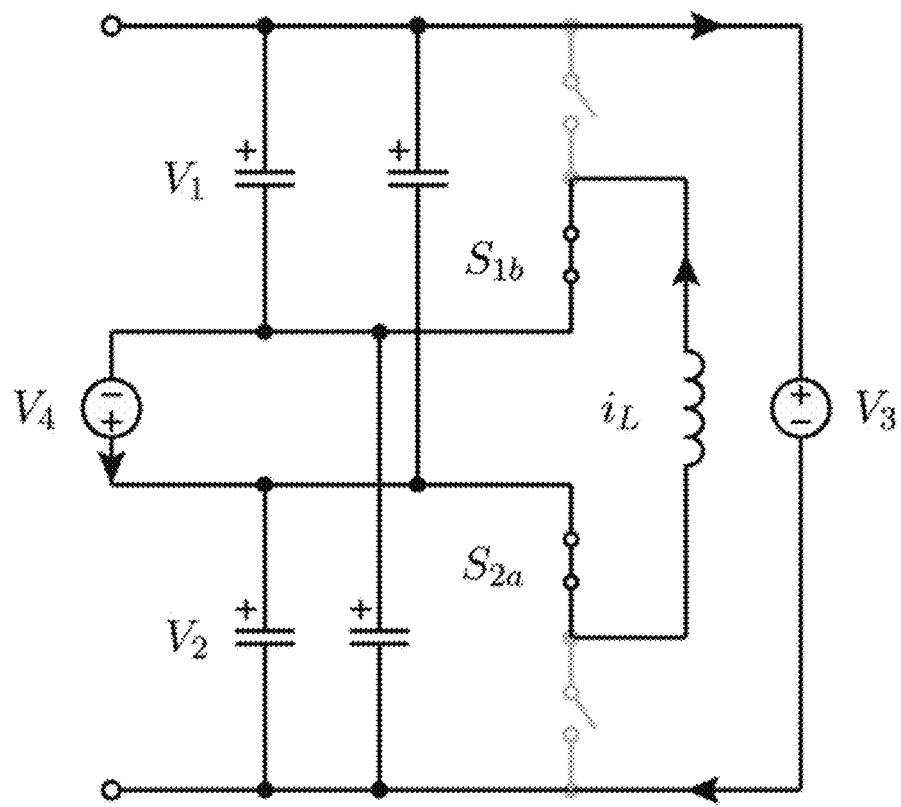
FIGS. 24A, 24B, 24C, 24D Equivalent circuit diagrams for FIG. 1 corresponding to (a) switching state #1: switch $S_{1b}$ and switch $S_{2a}$ turned on; (b) switching state #2: switch $S_{1a}$ and switch $S_{2a}$ turned on; (c) switching state #3: switch $S_{1a}$ and switch $S_{2b}$ turned on; (d) switch $S_{1b}$ and switch $S_{2b}$ turned on, respectively.
Figure 24B:
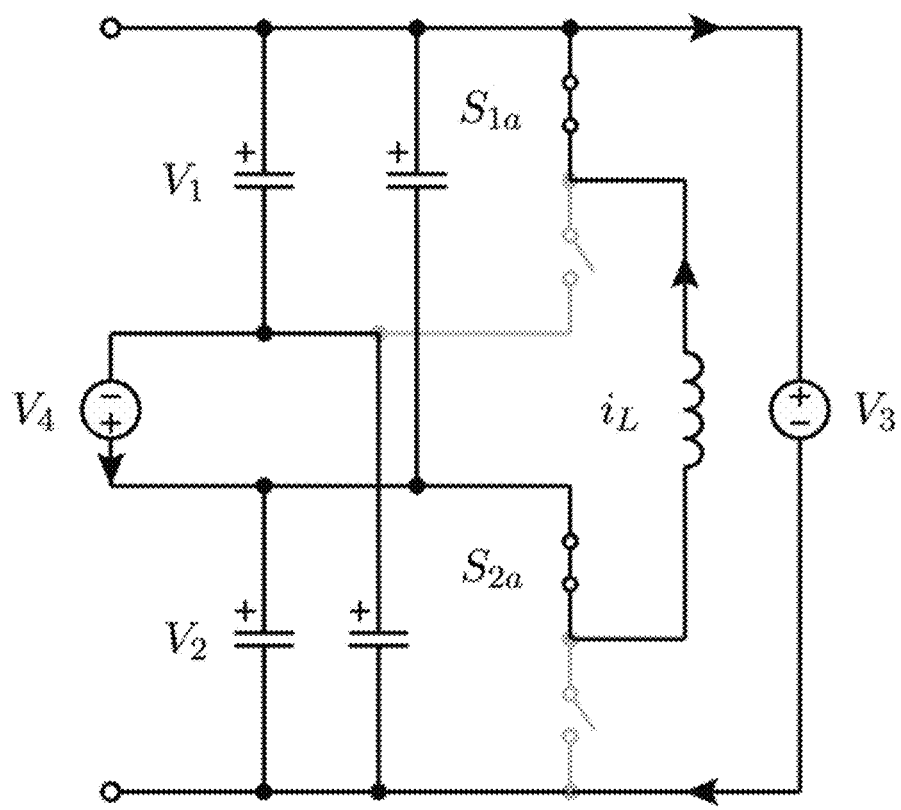
Figure 24C:
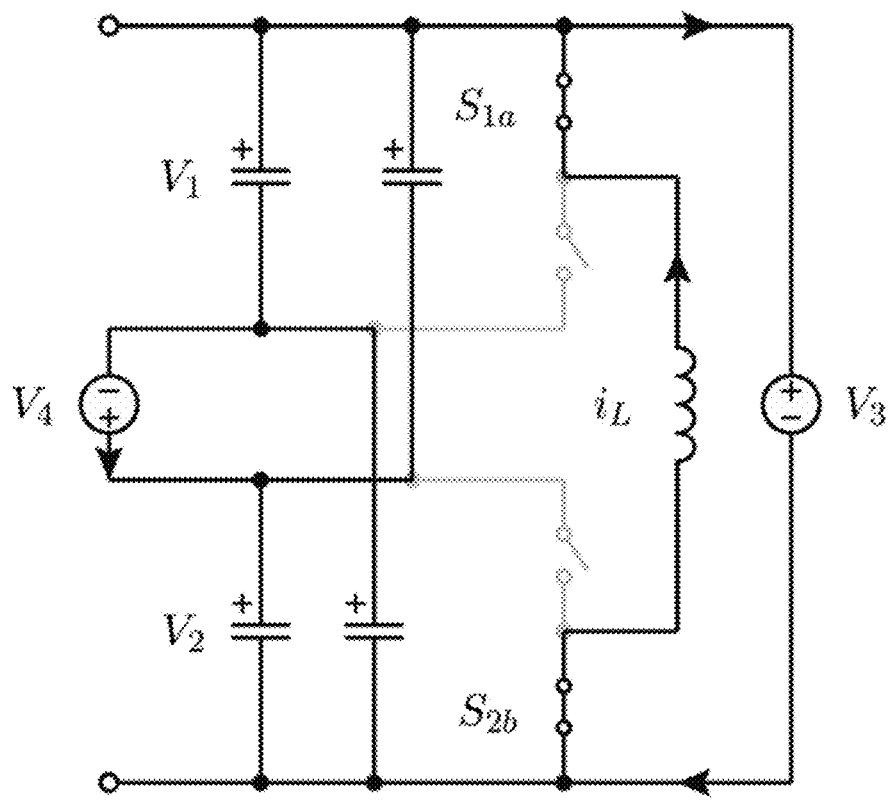
Figure 24D:
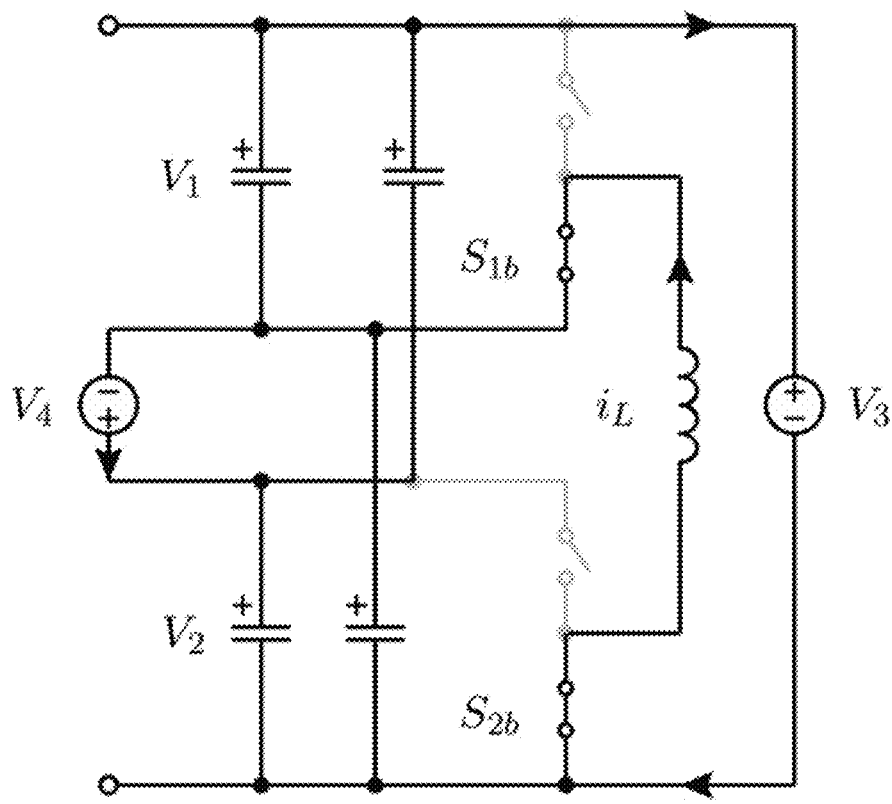

Another possible implementation of the topology can be observed in FIG. 23, where the three-port structure has been changed to a two port one. This change implies differences on the operation of the converter, as given the input port connection it will be able to either step up or down the output voltage, depending on the selected value for the duty cycle commands. The aforementioned structure does not alter the bidirectional capability of the topology, being able to transfer in both directions between the ports 1 and 2. In this case, the implementation of unidirectional variants it is also possible, by employing the suitable switching devices.

Single-Input Single-Output Converter Module: Theory of Operation

As stated earlier, the topology provides the flexibility of being operated in different ways. Following the same assumptions from the earlier operational principle, the converter generates four switching states, which are illustrated in FIG. 24A, FIG. 24B, FIG. 24C, and FIG. 24D. In order to determine the converter input/output relation, a volt-second balance analysis is performed once again. Given the fact that a single source is being used, this mode of operation would typically employ balanced duty cycles with $D_1 \approx D_2$ such that both cells process similar powers most of the time. While this is not necessary it simplifies analysis and explanation.

Consider the converter is operating in steady state, with $D_1=D_2=D$. The rise and fall of inductor current during its charging and discharging processes must be equal over one switching period, consequently, the following voltage relationship can be derived when equating the average inductor voltage to zero using IVSB:

$$V_3 = V_4 \frac{D}{1-D} \quad (8)$$

Regulation of the Converter Using the Sum-Difference Domain

While the general input/output voltage ratio of (8) is sufficient for understanding the basic steady state behaviour of the converter for typical use cases, for regulation of the converter requires a complete model of the system dynamics is required, accounting for unequal $D_1$ and $D_2$. The converter has 3 dynamic state variables, one of which depends explicitly on the difference in duty cycles ($D_1$-$D_2$). Dynamics of the converter are therefore most easily be examined through study of the sum and difference of the input capacitors' voltages; hence the following variables are introduced for control design:

$$V_\Sigma = V_1 + V_2 \quad (9)$$

$$V_\Delta = V_1 - V_2 \quad (10)$$

$$D_\Sigma = D_1 + D_2 \quad (11)$$

$$D_\Delta = D_1 - D_2 \quad (12)$$

Using FIG. 23 as reference and assuming that $C_1=C_2=C_d$ and $C_a=C_b=C_a$ and that $V_3$ is a known quantity, the dynamic equations relevant to the control of the converter can then be rewritten in terms of these quantities as follows:

$$L\frac{di_L}{dt} + R_L i_L = \frac{V_\Sigma D_\Sigma}{2} + \frac{V_\Delta D_\Delta}{2} - V_3 \quad (13)$$

$$C_d \frac{dV_\Sigma}{dt} = -I_4 - I_3 + i_L(1-D_\Sigma) \quad (14)$$

$$(C_d + C_o)\frac{dV_\Delta}{dt} = -D_\Delta i_L \quad (15)$$

Notice from FIG. 23 that $V_4=V_1+V_2-V_3$ hence regulation of $V_4$ is achieved through control of $V_\Sigma$ and $V_\Delta$ (which are convenient proxies for $V_1$ and $V_2$). In cases where V4 is known and V3 is to be regulated, the equations are readily reformulated with help of the constraint equation $V_4=V_1+V_2-V_3$. In this case it is regulation of $V_3$ that is achieved through control of $V_\Sigma$ and $V_\Delta$ (which are convenient proxies for $V_1$ and $V_2$).

Figure 25:
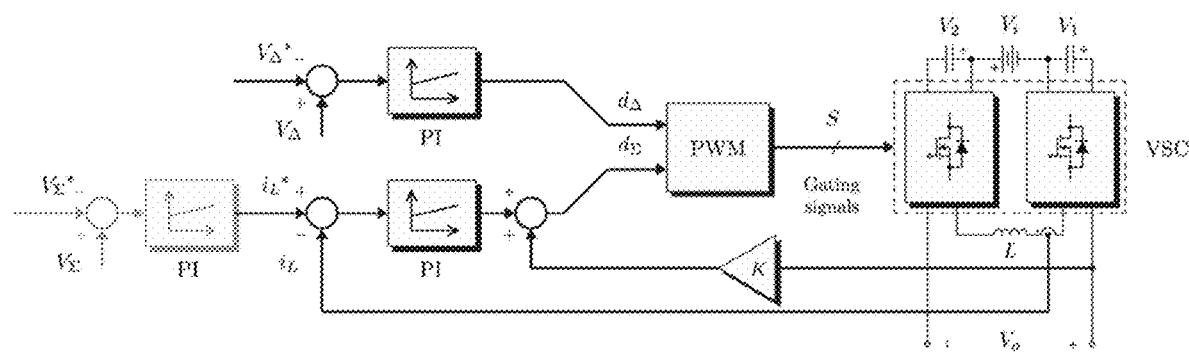
FIG. 25 Proposed general control scheme for the single-input single-output topology.
Figure 26:
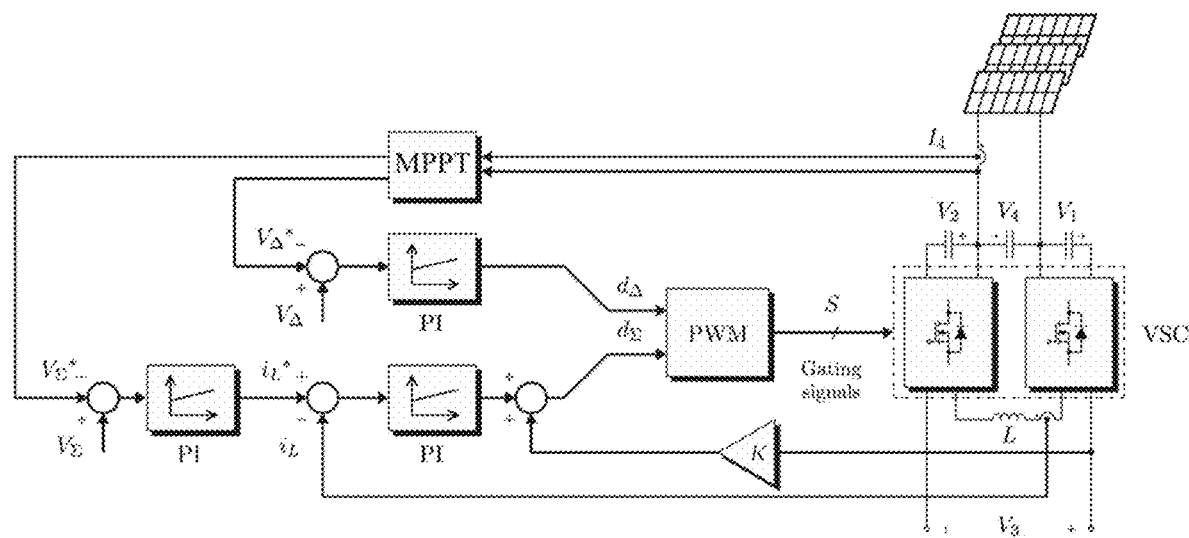
FIG. 26 Specific example of how to apply proposed for the single-input single-output topology with unidirectional power flow from a solar array with maximum peak power tracker.

This above model leads to the control scheme presented in FIG. 25. From the figure, it is possible to see that the difference voltage $V_\Delta$ is regulated by one control loop, most commonly it would tasked with maintaining zero difference voltage, though a non-zero difference may be requested. The sum voltage $V_\Sigma$ is regulated using a cascade control structure, that uses the inductor current $i_L$ as an intermediate variable. Once the sum and difference duty cycles have been obtained, $D_1$ and $D_2$ are reconstructed and given to the pulse-width modulator. Please note that there is a dependency of $i_L$ on $V_\Delta$ and if this is not addressed properly, it could lead to instability of the controller. Numerous methods exist in the literature to address this issue. A simple approach to reduce the coupling between the mentioned quantities is to select a $V_\Delta$ control loop bandwidth that is significantly smaller than that of the current regulator. This will ensure that the influence of $V_\Delta$ on the dynamics of $i_L$ remains small.

Depending on the nature of the input source employed in the converter, the reference signals and the implementation of the regulator will differ slightly. For example, if $V_3$ and $V_4$ are both assigned by external power networks then $V_\Sigma$ regulator is not needed at all. Instead the inductor current control loop will simply assign the amount of power flow between $V_3$ and $V_4$, as a function of its set point.

Simulation Results: Example Case Study Performance for the Proposed Single-Input Single-Output Converter Module with Unidirectional Power Flow In order to illustrate its operational principle and not limiting the application of the proposed control scheme, consider the case when the converter has a solar photovoltaic array connected to its input, as shown in FIG. 25. In this case, $V_3$ must adjust be become equal to the maximum power point voltage of the solar array, and $V_4$ is assumed constant. $V_\Sigma$ is therefore regulated to be the difference between the output voltage and the maximum power point voltage of the array, while $V_\Delta$ is set to zero to keep the input voltages balanced and operate in interleaved mode.

The validation of the proposed single-input single output variation and its sum-difference control scheme is performed in Matlab/Simulink®, using the PLECS® toolbox. The unidirectional system is rated for 32 kW and the model of the PV arrays simulated is based on the Sharp/NUU235F1 module, which has a rated power output of 235 W and 30 V under nominal conditions of temperature and solar irradiation. Considering this, each array comprises 34 series connected modules to reach the desired input voltage, and then these arrays are paralleled in order to meet the power requirements, in this case the array is comprised by 4 paralleled strings. The remaining system parameters used in the simulation are presented in Table 4

TABLE 4

Simulation Parameters for the Single-Input Single-Output Study Case.

| Parameter | Symbol | Value |
|---|---|---|
| dc-bus voltage | $V_3$ | 800 V |
| Rated power | $P_r$ | 32 kW |
| Input filter capacitance | $C_d$ | 60 μF |
| Output filter capacitance | $C_o$ | 10 μF |
| Interleaved reactor inductance | L | 214.5 μH |
| Interleaved reactor resistance | $R_L$ | 1.8 m Ω |
| Switching frequency | $f_s$ | 20 kHz |
| MPPT sampling time | $T_m$ | 0.2 s |
| PV string voltage | $V_{pv}$ | 1020 V |
| No. of strings connected in parallel | $N_P$ | 4 |
| No. of series connected PV modules per string | N | 34 |
| Open-circuit voltage of module | $V_{oc}$ | 37 V |
| Maximum power voltage of module | $V_{pm}$ | 30 V |
| Short-circuit current of module | $I_{sc}$ | 8.6 A |
| Maximum power of module | $I_{pm}$ | 7.84 A |

In order to test the dynamic performance of the system and also the MPPT capability of the converter, the following scenario is imposed: the system starts with both of the arrays under standard test conditions, i.e., with a solar irradiance of 1 kW/m² and a temperature of 25° C. Then at t=0.35 s, the irradiance of the arrays is reduced to 0.6 pu.

Given the fact that this approach does not have the possibility of asymmetrical generation, the dynamic scenario is changed to a simple reduction in the irradiance of the PV array, to illustrate the changes in the inductor current during lower power scenarios.

Figure 27:
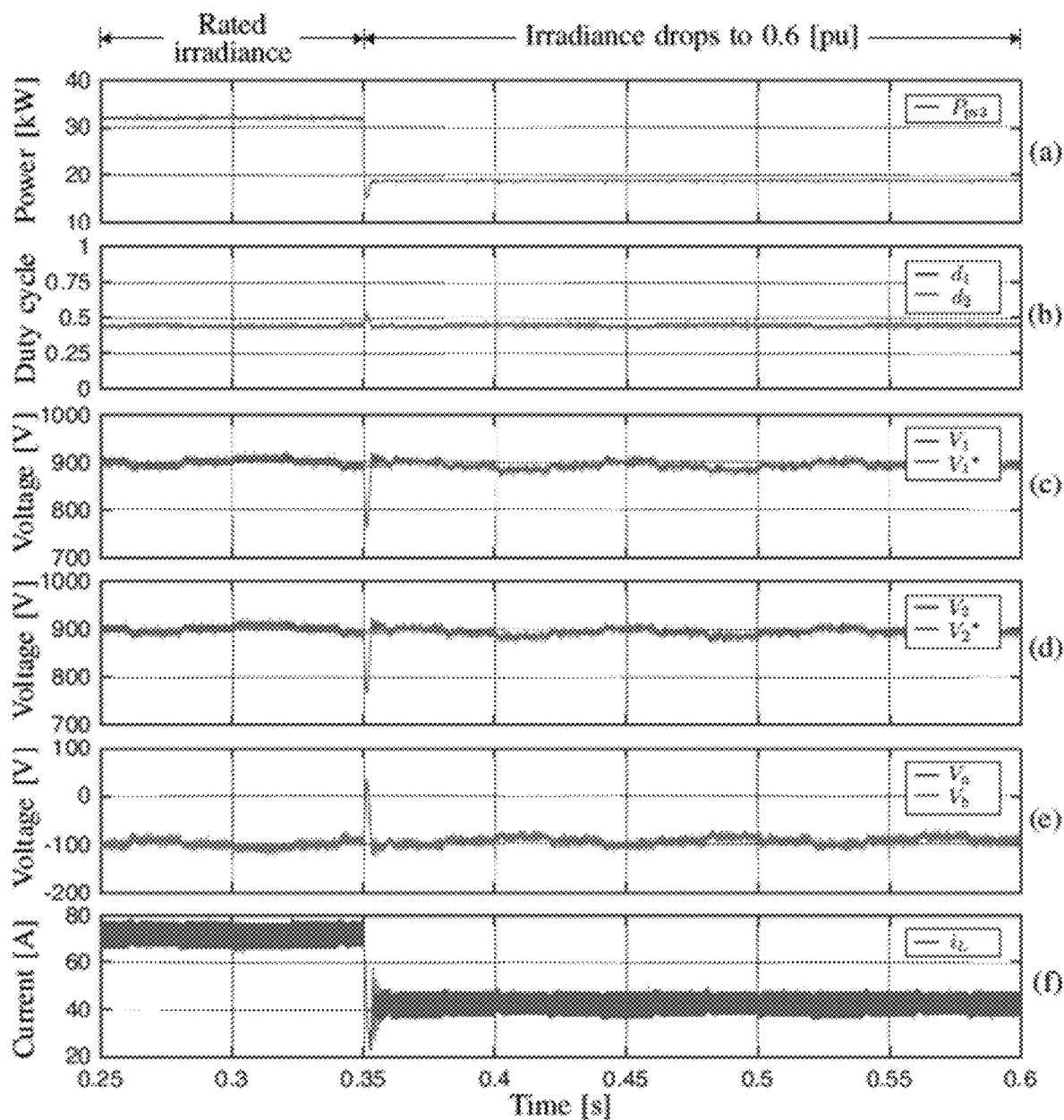
FIG. 27 Simulation results for a single-input single-output unidirectional converter structure of FIG. 23 employing solar panels, to illustrate the step up mechanism of the buck-boost operation.

The results obtained for the study case are presented in FIG. 27. From these results it is possible to appreciate some interesting differences in terms of the regular operation of the converter. The converter starts generating its rated power and drops to 0.6 pu after the disturbance in the irradiance, as presented in FIG. 27, (a). However, given that the same power is always processed by both cells, the duty cycles do not drift from each other after the disturbance takes place. This means that the converter remains operating in the interleaved mode regardless of the irradiance conditions. This situation is confirmed in FIG. 27, (b), where the duty cycles virtually exhibit no differences.

The previous statements are confirmed with the dynamic response of the input voltages, shown in FIG. 27, (c) and FIG. 27, (d). In the mentioned figures, $V_1$ and $V_2$ are maintained balanced for any scenario, with the exception of a brief transient due to the limited response of the MPPT algorithm to the sudden change in irradiance. Consequently, given the features of the proposed topology, if the input capacitors' voltages were not modified throughout the test, the interleaved capacitor voltages $V_a$ and $V_b$ also exhibit lower differences between them, as can be seen in FIG. 27, (e).

The biggest drawback of the buck-boost operating mode is an increase in the current handled by the inductor. The alternative connection of the PV arrays leads to the inductor handling the PV generated current in addition to the output current. As presented in FIG. 27, (f) the average current flowing through the inductor has been scaled by a factor of $$\frac{1}{1-d},$$

which suggests that the efficiency of the converter may be reduced in comparison to the cascaded buck operation.

Figure 28:
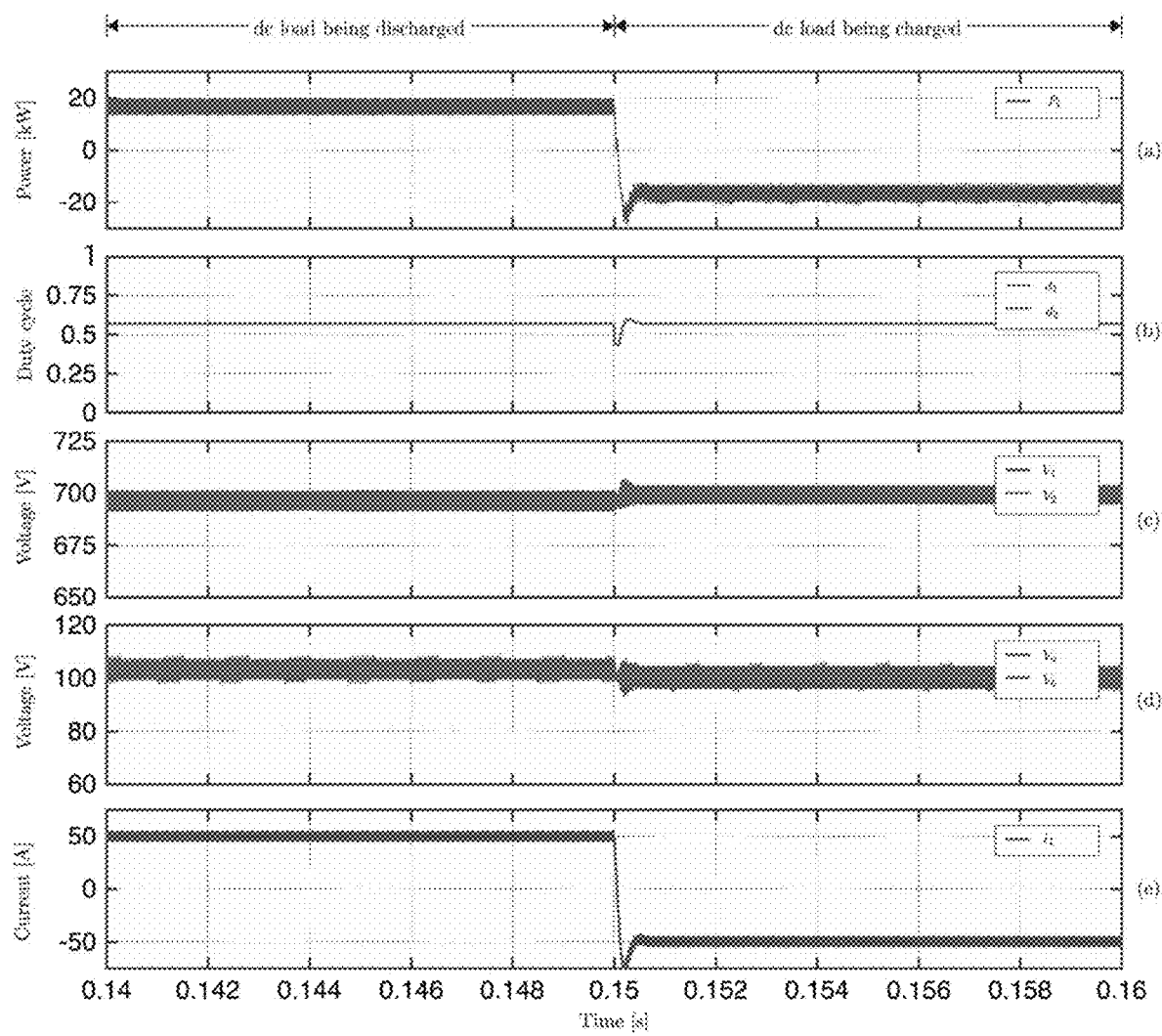
FIG. 28 Simulation results for a single-input single-output bidirectional converter structure of FIG. 23 employing battery modules, to illustrate the power reversal capability of the proposed converter.

Simulation Results: Example Case Study Performance for the Proposed Single-Input Single-Output Converter Module with Bidirectional Power Flow The single-input single-output variation of the proposed has the ability of handling power in both directions, i.e., from port 1 to port 2 or vice versa. To validate the ability to reverse the current flow, the outer voltage controller in FIG. 25 has been eliminated, the current reference is provided directly. The system will be driven from exchanging power from the terminals connected to $V_4$, i.e., the input dc source, toward the dc bus with voltage $V_4$, and then inverse this power exchange. The power exchanges will be performed at rated value, to cover the bigger power reversal possible in the system. The obtained results are presented in FIG. 30. It can be seen how the system reverses its power flow with a smooth transition while the controlled variables are not affected dramatically. FIG. 28, (a) exhibits the power being fed to the dc bus, and has a positive value before t=0.15 s and then it starts draining this rated value. As stated in the previous case study, the advantages of the single sourced topology is that the asymmetries between the upper and negative cells are marginal.

This is confirmed in FIG. 28, (b) which presents the duty cycles and basically show no differences, even during the transients. The balanced operation of the cells leads to an even distribution of the dc voltages, as presented in FIG. 28, (c) and FIG. 28, (d). The balanced voltages lead to the interleaved operation of the converter, allowing to maintain the multiplicative effect of the switching strategy throughout the entire operation range. The smooth transition achieved by the converter is confirmed in FIG. 28, (e) where the evolution of the inductor current $i_L$ is exhibited. This figure also confirms the ability of the topology to handle currents in both directions, allowing to charge or discharge the dc load connected to its inputs terminals. This enables the use of the topology in bidirectional applications, such as interfacing energy storage systems or fast charging electric vehicles battery packs.

Other Variations

The converter topology fundamentally displays 4 possible "ports", namely $V_1$, $V_2$, $V_3$ and $V_4$ and its structure imposes also one constraint: $V_1+V_2+V_3=V_4$. The foregoing discussion has focussed on the most common choices of ports that might be selected as converter "input/output", but this should not be limiting. For example, $V_2$ and $V_4$ could be chosen as "input/output" ports, leaving the voltages $V_3$ and $V_4$ as internal converter variables. While requires a change in regulation, bi-directional power flow between these newly chose ports is offered by the topology.

Description of FIG. 23

FIG. 23 shows a single-input single-output application of the converter module, using the functionally similar output capacitor configuration. In FIG. 23, the circuit has a first port and a second port. FIG. 23 shows a circuit having four capacitors, C1, C2, Ca, and Cb. The circuit has an inductor L, along with switches S1*a*, S1*b*, S2*a*, and S2*b*. Ca has (i) a positive terminal coupled to a positive node of a first switching cell that is electronically coupled to the positive terminal of C1, and (ii) a negative terminal coupled to a positive node of a second switching cell of the two switching cells that is electronically coupled to the positive terminal of C2. Cb has (i) a positive terminal coupled to a negative node of the first switching cell of the two switching cells that is electronically coupled to the negative terminal of C1, and (ii) a negative terminal coupled to a negative node of the second switching cell of the two switching cells that is electronically coupled to the negative terminal of C2.

The invention claimed is:

1. A system for interconnecting a plurality of energy storage devices to a DC bus, the system comprising:
    at least one interconnection circuit comprising:
        two switching cells including a first switching cell and a second switching cell, each switching cell including a pair of terminals and a switching node;
        a first capacitor having a (i) positive terminal coupled to a positive node of a first switching cell of the two switching cells, and a (ii) negative terminal coupled to a negative node of the first switching cell of the two switching cells; and
        a second capacitor having a (i) positive terminal coupled to a positive node of the second switching cell of the two switching cells, and a (ii) negative terminal coupled to a negative node of the second switching cell of the two switching cells; and
        an additional capacitor or capacitor network, providing a capacitance between the first switching cell and the second switching cell;
        a filter inductor connected between the two switching cells;
        wherein a DC load or source is connected between the positive terminal of the second switching cell and the negative terminal of the first switching cell;
        wherein the DC bus is connected between the negative terminal of the second switching cell and the positive terminal of the first switching cell;
        a switching cell controller configured to:
            regulate the difference in voltage between a first capacitor voltage of the first capacitor and a second capacitor voltage of the second capacitor; and
            regulate a current exchange between the DC bus and the DC load or source.

2. The system of claim 1, wherein a first switching cell of the two switching cells operates at a duty cycle $D_1$, and wherein a second switching cell of the two switching cells operates at a duty cycle $D_2$.

3. The system of claim 2, wherein each switching node for each switching cell comprises two switches, which operate alternatively such that the duty cycles $D_1$ and $D_2$ control a percentage time that a corresponding first switch of the two switches for the corresponding switching node is conducting, and the corresponding second switch of the two switches for the corresponding switching node is not conducting.

4. The system of claim 2, wherein $D_1$ is approximately equal to $D_2$ during steady-state operation.

5. The system of claim 2, wherein a difference in duty cycles ($D_1$-$D_2$) is used for regulation of the at least one interconnection circuit.

6. The system of claim 5, wherein the at least one interconnection circuit is configured to operate based at least on at least 3 dynamic state variables, (a) the difference in duty cycles ($D_1$-$D_2$), (b) $V_\Sigma = V_1 + V_2$, and (c) $V_\Delta = V_1 - V_2$, wherein $V_1$ is a voltage across an input capacitor of one of the two switching cells, and $V_2$ is a voltage across an input capacitor of the other of the two switching cells.

7. The system of claim 6, wherein $V_3$ is the target voltage at the DC bus, and $V_4$ is a voltage difference between the two switching cells, and wherein $V_3$ or $V_4$ are regulated by control of $V_\Sigma$ and $V_\Delta$.

8. The system of claim 7, wherein $V_\Sigma$ is regulated using a cascade control structure that uses an inductor current $i_L$ of the filter inductor as an intermediate variable.

9. The system of claim 7, wherein $V_\Delta$ is regulated using a control loop.

10. The system of claim 6, wherein after the $V_\Sigma$ and the difference in duty cycles ($D_1$-$D_2$) have been obtained, $D_1$ and $D_2$ are reconstructed and provided to the switching cell controller.

11. A method for interconnecting a plurality of energy storage devices to a DC bus using at least one interconnection circuit including two switching cells including a first switching cell and a second switching cell, each switching cell including a pair of terminals and a switching node, the at least one interconnection circuit including a first capacitor having a (i) positive terminal coupled to a positive node of a first switching cell of the two switching cells, and a (ii) negative terminal coupled to a negative node of the first switching cell of the two switching cells; and
    a second capacitor having a (i) positive terminal coupled to a positive node of the second switching cell of the two switching cells, and a (ii) negative terminal coupled to a negative node of the second switching cell of the two switching cells; and
    an additional capacitor or capacitor network, providing a capacitance between the first switching cell and the second switching cell, and a filter inductor connected between the two switching cells; wherein a DC load or source is connected between the positive terminal of the second switching cell and the negative terminal of the first switching cell;
    wherein the DC bus is connected between the negative terminal of the second switching cell and the positive terminal of the first switching cell, the method comprising:
        regulating a difference in voltage between a first capacitor voltage of the first capacitor and a second capacitor voltage of the second capacitor; and
        regulating a current exchange between the DC bus and the DC load or source.

12. The method of claim 11, wherein a first switching cell of the two switching cells operates at a duty cycle $D_1$, and wherein a second switching cell of the two switching cells operates at a duty cycle $D_2$.

13. The method of claim 12, wherein each switching node for each switching cell comprises two switches, which operate alternatively such that the duty cycles $D_1$ and $D_2$ control a percentage time that a corresponding first switch of the two switches for the corresponding switching node is conducting, and the corresponding second switch of the two switches for the corresponding switching node is not conducting.

14. The method of claim 13, wherein a difference in duty cycles ($D_1$-$D_2$) is used for regulation of the at least one interconnection circuit.

15. The method of claim 13, wherein the at least one interconnection circuit is configured to operate based at least on at least 3 dynamic state variables, (a) the difference in duty cycles ($D_1-D_2$), (b) $V_\Sigma=V_1+V_2$, and (c) $V_\Delta=V_1-V_2$, wherein $V_1$ is a voltage across an input capacitor of one of the two switching cells, and $V_2$ is a voltage across an input capacitor of the other of the two switching cells.

16. The method of claim 15, wherein $V_3$ is the target voltage at the DC bus, and $V_4$ is a voltage difference between the two switching cells, and wherein $V_3$ or $V_4$ are regulated by control of $V_\Sigma$ and $V_\Delta$.

17. The method of claim 15, wherein $V_\Sigma$ is regulated using a cascade control structure that uses an inductor current $i_L$ of the filter inductor as an intermediate variable.

18. The method of claim 15, wherein after $V_\Sigma$ and the difference in duty cycles ($D_1-D_2$) have been obtained, $D_1$ and $D_2$ are reconstructed and provided to the switching cell controller.

19. A non-transitory computer readable medium storing machine interpretable instructions, which when executed by a processor, cause the processor to execute a method for interconnecting a plurality of energy storage devices to a DC bus using at least one interconnection circuit including two switching cells including a first switching cell and a second switching cell, each switching cell including a pair of terminals and a switching node, the at least one interconnection circuit including first capacitor having a (i) positive terminal coupled to a positive node of a first switching cell of the two switching cells, and a (ii) negative terminal coupled to a negative node of the first switching cell of the two switching cells; and a second capacitor having a (i) positive terminal coupled to a positive node of the second switching cell of the two switching cells, and a (ii) negative terminal coupled to a negative node of the second switching cell of the two switching cells; and an additional capacitor or capacitor network, providing a capacitance between the first switching cell and the second switching cell; wherein a DC load or source is connected between the positive terminal of the second switching cell and the negative terminal of the first switching cell;

wherein the DC bus is connected between the negative terminal of the second switching cell and the positive terminal of the first switching cell, the method comprising:

regulating a difference in voltage between a first capacitor voltage of the first capacitor and a second capacitor voltage of the second capacitor; and regulating a current exchange between the DC bus and the DC load or source.

20. The non-transitory computer readable medium of claim 19, wherein a first switching cell of the two switching cells operates at a duty cycle $D_1$;

wherein a second switching cell of the two switching cells operates at a duty cycle $D_2$;

wherein each switching node for each switching cell comprises two switches, which operate alternatively such that the duty cycles $D_1$ and $D_2$ control a percentage time that a corresponding first switch of the two switches for the corresponding switching node is conducting, and the corresponding second switch of the two switches for the corresponding switching node is not conducting;

wherein a difference in duty cycles ($D_1-D_2$) is used for regulation of the at least one interconnection circuit; and wherein the at least one interconnection circuit is configured to operate based at least on at least 3 dynamic state variables, (a) the difference in duty cycles ($D_1-D_2$), (b) $V_\Sigma=V_1+V_2$, and (c) $V_\Delta=V_1-V_2$, wherein $V_1$ is a voltage across an input capacitor of one of the two switching cells, and $V_2$ is a voltage across an input capacitor of the other of the two switching cells.

* * * * *